US010346659B1

(12) United States Patent
Ahmed et al.

(10) Patent No.: US 10,346,659 B1
(45) Date of Patent: Jul. 9, 2019

(54) SYSTEM FOR READING TAGS

(71) Applicant: AMAZON TECHNOLOGIES, INC., Seattle, WA (US)

(72) Inventors: Ejaz Ahmed, Marlborough, MA (US); Jeremy Samuel De Bonet, Southborough, MA (US); Oded Maron, Sudbury, MA (US); Mirko Ristivojevic, Cambridge, MA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/927,561

(22) Filed: Mar. 21, 2018

(51) Int. Cl.
*G06K 7/10* (2006.01)
*G06T 7/30* (2017.01)
*G06Q 10/08* (2012.01)
*G06K 7/12* (2006.01)

(52) U.S. Cl.
CPC ....... *G06K 7/10861* (2013.01); *G06K 7/1097* (2013.01); *G06K 7/12* (2013.01); *G06Q 10/08* (2013.01); *G06T 7/30* (2017.01); *G06K 2007/10485* (2013.01); *G06K 2007/10504* (2013.01); *G06T 2207/20* (2013.01)

(58) Field of Classification Search
CPC .... G06K 7/10861; G06K 7/1097; G06K 7/12; G06K 2007/10504; G06K 2007/10485; G06T 7/30; G06T 2207/20; G06Q 10/08
See application file for complete search history.

(56) References Cited

U.S. PATENT DOCUMENTS

| 7,225,980 | B2 | 6/2007 | Ku et al. |
| 7,949,568 | B2 | 5/2011 | Fano et al. |
| 8,009,864 | B2 | 8/2011 | Linaker et al. |
| 8,189,855 | B2 | 5/2012 | Opalach et al. |
| 8,283,004 | B2 * | 10/2012 | Bala ........ B41M 3/144 283/92 |
| 8,630,924 | B2 | 1/2014 | Groenevelt et al. |
| 9,235,928 | B2 | 1/2016 | Medioni et al. |
| 9,473,747 | B2 | 10/2016 | Kobres et al. |

(Continued)

FOREIGN PATENT DOCUMENTS

JP          2000058921 A  *  2/2000  ......... G06K 7/10584

OTHER PUBLICATIONS

Asthana, et al., "An Indoor Wireless System For Personalized Shopping Assistance", CiteSeerX, In Proceedings of IEEE Workshop on Mobile Computing Systems and Applications, 1994. Retrieved from the Internet: <URL:http://citeseerx.ist.psu.edu/viewdoc/summary?doi=10.1.127.3033>.

(Continued)

*Primary Examiner* — Seung H Lee
(74) *Attorney, Agent, or Firm* — Lindauer Law, PLLC

(57) ABSTRACT

Tags comprising marks arranged in a predetermined pattern are applied to an item. The marks are made with an ink that fluoresces under infrared (IR) light. A camera with a filter acquires an image of the light emitted by the fluorescence of the ink. This image is processed to determine a portion of the image in which the tag is located. Once located, that portion is processed to rectify and align the tag. This rectified image is then processed to read out tag data that is encoded by the arrangement of marks. The tag data may then be used to identify the item, designate shipping information, and so forth.

20 Claims, 12 Drawing Sheets

(56) References Cited

U.S. PATENT DOCUMENTS

| | | | |
|---|---|---|---|
| 2007/0037195 A1* | 2/2007 | Ho | C12C 1/6813 435/6.11 |
| 2011/0011936 A1 | 1/2011 | Morandi et al. | |
| 2012/0284132 A1 | 11/2012 | Kim et al. | |
| 2013/0284806 A1 | 10/2013 | Margalit | |
| 2015/0086107 A1 | 3/2015 | Dedeoglu et al. | |
| 2015/0262194 A1* | 9/2015 | Dunlop | G06Q 30/0185 705/318 |

OTHER PUBLICATIONS

Kalnikaite, et al., "How to Nudge In Situ: Designing Lambent Devices to Deliver Information Salience in Supermarkets", ACM, In proceeding of: UbiComp 2011:Ubiquitous Computing, 13th International Conference, UbiComp 2011, Beijing,China, Sep. 17-21, 2011.Retrieved from the Internet: <URL:http://www.researchgate. net/publication/221568350_How_to_nudge_in_Situ_designing_ lambent_devices_to_deliver_salient_information_in_supermarkets>.

Pop, "Introduction to the BodyCom Technology", AN1391, DS01391A, Microchip Technology, Inc., May 2, 2011.

Vu, et al., "Distinguishing Users with Capacitive Touch Communication", WINLAB, Rutgers University, In proceedings of: The 18th Annual International Conference on Mobile Computing and Networking ("MobiCom'12"), Aug. 22-26, 2012, Istanbul, Turkey.

\* cited by examiner

SYSTEM FOR READING TAGS

BACKGROUND

Retailers, wholesalers, warehouse operators, shippers, airlines, and other organizations who handle items typically maintain an inventory of, or track, various items that may be ordered, purchased, leased, borrowed, rented, viewed, shipped, and so forth, by clients or customers. For example, an e-commerce website may maintain inventory in a fulfillment center. When a customer orders an item, the item is picked from inventory, routed to a packing station, packed, and shipped to the customer. Likewise, physical stores maintain inventory in customer accessible areas, such as in a shopping area, and customers can pick items from the inventory and take them to a cashier for purchase, rental, and so forth.

Many physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers, and so forth. In each instance, for an item to be moved from one location to another, it is picked from its current location and transitioned to a new location. It is often desirable to monitor the movement of inventory within the facility.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
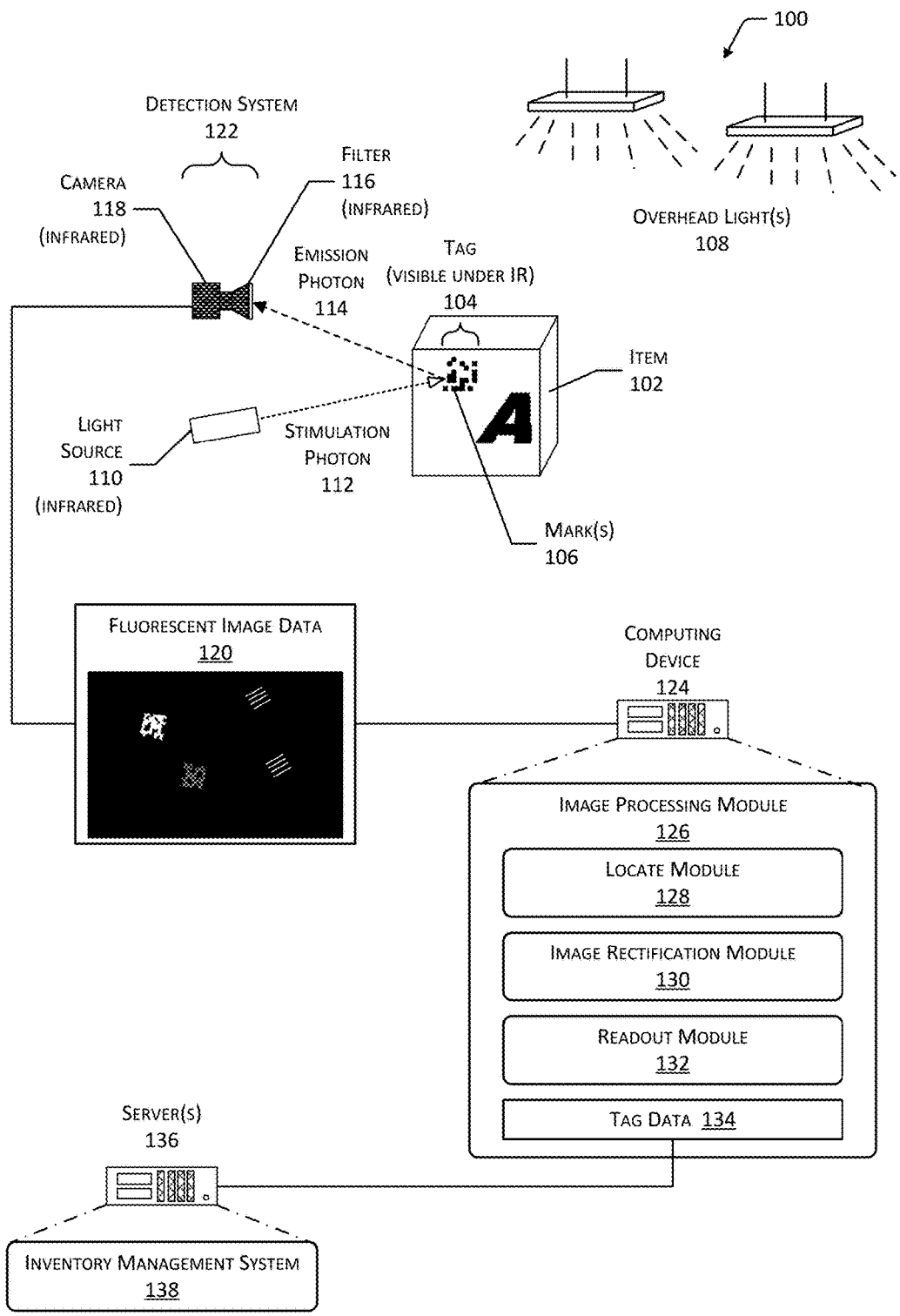
FIG. 1 illustrates a system that processes fluorescent image data of a tag comprising fluorescent marks to determine tag data, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DESCRIPTION

Organizations may use tags to store and provide information about an item. Tags may be printed on labels that are then affixed to the item, printed on the item, and so forth. For example, a tag encoding information about a destination shipment address may be printed and then affixed to a parcel to facilitate shipment of the parcel. In another example, a universal product code (UPC) barcode may be printed on a cereal box to facilitate checkout of the box.

Systems for reading tags are traditionally constrained. These constraints may include special requirements for placement of sensors, use of many sensors, tag alignment requirements that dictate specific placement of tags on the items, and so forth. Existing fully automated tag reading systems are particularly constrained, resulting in systems that either require expensive data acquisition and processing hardware, introduce time lag due to processing time, and so forth. These constraints limit the deployment of these existing fully automated systems.

As described in this disclosure, a tag is created that includes marks that are visible when undergoing fluorescence. In one implementation, the tag may comprise markings using an ink that, when exposed to stimulation photons of a particular wavelength of infrared light, fluoresces and produces emission photons. The tag may be invisible or minimally visible when viewed in the visible light spectrum. A camera with a filter is used to detect these emission photons while filtering out other wavelengths, such as the stimulation photons. For example, the filter may pass the photons emitted by fluorescence while blocking photons of other wavelengths. The camera produces fluorescent image data. A tag that is within the field of view of the camera is visible in the fluorescent image data.

By generating and using the fluorescent image data, features that would otherwise be present in a traditional monochrome or color image are omitted. For example, objects in the foreground and the background that do not fluoresce in the particular wavelength may appear black, and thus present no detail within the fluorescent image data. The fluorescent image data, in addition to the tag which is depicted, contains fewer features and artifacts and is thus simpler to subsequently process.

The fluorescent image data is processed to determine the tag data. The tag data comprises at least a portion of the information that is encoded by the symbols of the tag. For example, the tag data may comprise a stock keeping unit (SKU) number, a shipment tracking number, a serial number, and so forth.

The tag data may be decoded with a process that involves locating the tag that is present in the fluorescent image data, rectifying the image of the tag, and reading out the tag data from the rectified images.

To locate the tag present in the fluorescent image data, gradient magnitude data for the fluorescent image data is determined. For example, gradient magnitude data along the X and Y axes of the fluorescent image data may be calculated, and a gradient magnitude value for each pixel determined. The gradient magnitude data is processed using a sliding window technique with windows of different sizes. For each window, a window score for each of the windows is calculated. In one implementation the window score may be based on the gradient magnitude values and the area of the window.

Once calculated, the window scores may then be assessed to determine candidate windows, those windows which are deemed likely to contain some feature of interest. For example, the top K non-maxima suppressed windows may be selected as candidate windows. The boundaries of these candidate windows are used to generate candidate tag boundary data that describes a boundary around the feature of interest. In some situations, the boundary may not fully encompass the entire tag. Extended boundary data may be determined by increasing the size of the boundary indicated by the candidate tag boundary data.

In some implementations a confidence value may be determined that is indicative of a likelihood that the extended boundary data encompasses an area that includes a tag. The extended boundary data associated with the greatest confidence value may then be used to determine patch data.

Patch data is generated that is indicative of the area in the fluorescent image data that is within the boundary indicated by extended boundary data. For example, the patch data may comprise a portion of the fluorescent image data that is likely to contain a tag.

The image of the tag included in the patch data may be skewed, exhibit perspective effects, rotated, and so forth. The system may use the patch data to generate rectified patch data. The rectified patch data comprises an image that is based on the patch data, but which has undergone one or more transformations to produce an image of the tag that is aligned to one or more predetermined axes and exhibits no significant skew or perspective effect. For example, the rectified patch data may be considered an orthonormal rendering of the tag.

In one implementation, the rectification may involve generating, from the patch data, binarized patch data, in which each pixel is representative of either a first value or a second value. A first pair of corners are determined by finding the projections of first and last pixels with the second value (such as a binary 1) along a first diagonal line extending from one corner of the binarized patch data to the other. A second diagonal line perpendicular to the first diagonal line is determined at a midpoint between the first pair of corners. A second pair of corners are determined by finding the projections of first and last pixels with the second value along the second diagonal line. An image transform function uses the four corners that have been determined and remaps the binarized patch data so the four corners form a rectangle. The process of using projections to find the corners may be iterated until a convergence point is reached, producing the rectified patch data.

The rectified patch data may then be processed to determine whether particular cells of the tag are representative of a first cell value or a second cell value. In one implementation, cell boundaries representative of a rectangular grid associated with the tag are designated with respect to the rectified patch data. For example, if the rectified patch data is 200×200 pixels, and the tag is an 8×8 square of cells, the rectified patch data may be subdivided into cells measuring 25×25 pixels.

A cell score is determined for each cell. In one implementation, the cell score may comprise convolving pixel intensity values for pixels within each cell using a Gaussian filter to generate convolved data. This calculation results in more weight being given to the intensity values of the pixels in the center of the cell and less weight being given to the intensity of the pixels at the edges. The cell score may comprise the sum of the convolved pixel intensity values within the cell.

Probability distribution data is generated using the cell scores. For example, the probability distribution data may comprise a probability distribution function that describes a first probability that a particular cell score is indicative of a first cell value (such as white) or a second probability that the particular cell score is indicative of a second cell value (such as black).

The probability distribution data is used to evaluate the cell scores for each cell and determine a cell value for each cell. For example, the cell value may indicate that the cell is white or black. A confidence value that is indicative of a likelihood that the cell has a particular value may be determined using the first and second probabilities. Tag confidence data may be generated that indicates the cell value and associated confidence value for each cell.

In some implementations, the tag confidence data may be used to determine the orientation of the tag. For example, the tag as presented in the rectified patch data may exhibit four possible orientations. The cell values presented in the tag confidence data for particular cells may be determined for particular values. By assessing the cell values present in the particular cells and comparing the output of the four possible orientations, the orientation of the tag may be determined.

In some situations, some of the cells may have relatively low confidence values. Possible tag variants may be generated by inverting the values of one or more cells that exhibit low confidence values. Subsequent processing of these possible tag variants may facilitate determining the tag data in situations where otherwise the tag would be unreadable. For example, a particular cell may be determined to be a first cell value (white) but with a low confidence value of 0.1. A possible tag variant may be generated that has that particular cell with a second cell value (black).

The tag depicted in the rectified patch data and expressed as the tag confidence data, and also the alternatives described by the possible tag variants, may then be decoded to produce tag data. For example, the particular cell values in the particular positions within the grid may be processed to determine a string of text, numbers, or other data.

The techniques and devices described in this disclosure allow for computationally efficient, highly accurate, high speed, and fully automated tag reading, that may be deployed at relatively low cost. For example, the techniques described in this disclosure may be quickly performed using single board computers or other computer systems with modest memory and computational capabilities. Continuing the example, the image processing to determine the tag data may be performed at the camera, eliminating the need to transfer large image files across a network. This reduces network bandwidth requirements and also reduces the overall latency in the system from scan to readout of tag data. These techniques significantly reduce or eliminate the constraints of traditional systems, allowing the system described in this disclosure to be implemented in a wide variety of different environments and for a wide variety of uses. FIG. 1 illustrates a system 100 for reading a tag comprising fluorescent marks to determine tag data, according to some implementations. Organizations may move, handle, store, ship, or otherwise interact with items 102. For example, items 102 may comprise products for sale, parcels, individual components used during manufacture, and so forth.

To facilitate these interactions, items 102 may have one or more tags 104. Each tag 104 includes marks 106, with the color and position of the marks 106 used to encode data. For example, the tag 104 may comprise an 8×8 square array of square cells. The relative position of a cell and whether it exhibits a first cell value (such as white) or a second cell value (such as black) may be used to encode tag data. The tag data may include shipment information, stock keeping unit, serial number, expiration date, error correction information, and so forth.

In some implementations the tag 104 may be printed onto, etched into, embossed into, or otherwise incorporated into the item 102. In other implementations the tag 104 may be printed onto labels, placards, or other objects that may then be affixed to the item 102.

The location at which the system 100 is present may include one or more overhead lights 108. For example, these overhead lights 108 may provide visible light suitable for use by human operators, visible light vision systems on robotic devices, and so forth. Visible light may be representative of light having a wavelength of between 400-700 nanometers (nm). Infrared (IR) light, in comparison exhibits wavelengths of about 700 nm to 1 millimeter (mm), while ultraviolet (UV) light exhibits wavelengths of about 10 nm to 400 nm.

The marks 106 in the tag 104 may be designed to be visible when they fluoresce. This fluorescence may occur when stimulated with IR light. In this illustration a light source 110 produces a stimulation photon 112. The light source 110 may comprise a light emitting diode (LED), quantum dot, incandescent lamp, fluorescent lamp, and so forth. The light source 110 may be dedicated to providing illumination of the items 102, or may be integrated into other fixtures, such as part of the overhead lights 108.

A fluorescent material such as a dye with fluorophores, a quantum dot, and so forth may interact with an incident stimulation photon 112 and subsequently release an emission photon 114, producing the fluorescence effect. For example, the fluorescent dye may comprise Fabricolor dye 80821 that fluoresces under IR light. Fabricolor dyes are available from Fabricolor Holding International LLC of Paterson, N.J., United States of America. In other implementations, other dyes may be used. In another example, the quantum dots may comprise nanometer-size particles of a semiconductor material.

The stimulation photon 112 has a first wavelength while the emission photon 114 exhibits a second wavelength that is different from the first wavelength. In one implementation, the stimulation photon 112 may have a wavelength of between 800 and 830 nm. The emission photon 114 may have a wavelength of between 840 nm and 860 nm. For example, when excited by a stimulation photon 112 having a wavelength of 810 nm, the fluorescent material may fluoresce and produce an emission photon 114 with a wavelength of about 850 nm.

The difference between a stimulation wavelength of the stimulation photon 112 and an emission wavelength of the emission photon 114 may be at least 30 nm. For example, the stimulation wavelength may be approximately 808 nm while the emission wavelength is approximately 850 nm.

The light source 110 may provide the stimulation photons 112 that are used to elicit fluorescence from the fluorescent material in the marks 106. The light source 110 may include a laser, light emitting diode, incandescent bulb, fluorescent bulb, and so forth. For example, the light source 110 may comprise a 500 milliwatt (mW) laser diode emitting at 808 nm, with the output diffused using a 120 grit ground glass diffuser. The light source 110 may be configured to utilize pulsed operation. For example, the light source 110 may generate pulses with a 400 microsecond (µs) duration that produce 10 mW/cm$^2$ of infrared (IR) light at the item 102. In some implementations the light source 110 may be incorporated into the overhead lights 108.

In some situations, the marks 106 may be invisible or only slightly apparent to the unaided eye. The marks 106 may be produced using a fluorescent material or a non-fluorescent material. For example, a label substrate such as kraft paper may be non-fluorescent to infrared light at a particular wavelength. To produce a mark 106 with a first cell value, such as appearing "white" due to fluorescence, the fluorescent material may be applied to the kraft paper at the appropriate location. To produce a mark 106 with a second cell value, such as appearing "black", the kraft paper may be left unchanged.

To encode data, the tag 104 may utilize two or more different values or "colors". While this disclosure may describe a first cell value as being "white" and representative of a binary zero while a second cell value is "black" and representative of a binary one, it is understood that these two values may be swapped. For example, fluorescent material may be applied to create a fluorescent "white" mark 106 that is used to represent a binary one.

A filter 116 is included in an optical path of a camera 118. The filter 116 is configured to allow for the transmittance of the emission photons 114, but may attenuate or block photons at other wavelengths, including the stimulation photons 112. For example, the filter 116 may be configured to transmit photons with a wavelength of between 840 and 860 nm, while attenuating or blocking others. In one implementation the filter 116 may comprise an OD4 filter centered on 850 nm that transmits photons with a wavelength of between 837.5 to 862.5 nm. In some implementations the filter 116 may be omitted. For example, the camera 118 may comprise a narrowband detector that is sensitive to the emission photons 114 and not the stimulation photons 112 or photons at other wavelengths such as visible light.

The camera 118 may comprise one or more of a photomultiplier device, charge coupled device, complementary metal oxide semiconductor, microbolometer, and so forth. The camera 118 may be configured to generate fluorescent image data 120. For example, the fluorescent image data 120 may comprise a bitmap. In some implementations the camera 118 may acquire images at between 30 frames per second (FPS) and 120 FPS.

For ease of discussion, and not necessarily as a limitation, a detection system 122 is shown that includes the light source 110 and the camera 118. In other implementations the detection system 122 may include the overhead lights 108 that may be provided to operate as the light source 110 for acquiring the fluorescent image data 120. While a single camera 118 and light source 110 are depicted, it is understood that various numbers of these devices may be used. For example, several light sources 110 at different locations may provide illumination for a single camera 118. In another example, a single light source 110 may provide illumination for two cameras 118.

Because of the use of one or more filters 116 or the camera 118 having a detector that is responsive to the emission photon 114 and not the stimulation photon 112, features other than the marks 106 are suppressed. In the fluorescent image data 120, the marks 106 are apparent and detectable. The background, such as a visible mark of a letter "A" and the surface of the item 102, appear black in the fluorescent image data 120 because they do not produce emission photons 114, or produce a quantity of emission photons 114 that are below a threshold value.

In some implementations, spurious signals may be suppressed or eliminated by controlling the ambient illumination of the item 102 during detection. For example, the ambient lighting systems may utilize fluorescent elements, electroluminescent elements, or light emitting diode elements to produce ambient light that produces light at the wavelength of the emission photon 114 that is below a threshold level of intensity. For example, where the emission photon 114 has a wavelength of 850 nm, the shelf lighting at an inventory location and overhead lighting may be designed or filtered to remove light at 850 nm. By reducing or eliminating sources of light in the wavelength of the emission photons 114 of interest, the background may be further suppressed, significantly reducing the computational complexity in locating and extracting the marking from the fluorescent image data 120.

The light source 110 and the camera 118 may operate at some distance from the item 102. For example, the light source 110 and the camera 118 may be between 2 and 4 meters away from the item 102. In one implementation the light source 110 and the camera 118 may be mounted overhead within the facility, such that during placement of an item 102 to, or removal from, an inventory location such as a shelf, the fluorescent image data 120 of the marks 106 may be generated. The light source 110 and the camera 118 may be located adjacent to one another or may be separate. For example, the light source 110 may be at a first location, such as built into an underside of a shelf, while the camera 118 is positioned overhead. In other implementations, one or more of the light source 110 or the camera 118 may be closer, such as less than 1 meter from the item 102 during use.

The fluorescent image data 120 is provided to a computing device 124. In some implementations the camera 118 and the computing device 124 may be incorporated into a common chassis or assembly. The computing device 124 may include an image processing module 126 which includes a locate module 128, image rectification module 130, and a readout module 132. The locate module 128 is configured to locate one or more "patches" or portions of the fluorescent image data 120 that could be tags 104. An image rectification module 130 then processes at least some of these patches to generate rectified data. The readout module 132 processes the rectified patches, producing as output tag data 134. The computing device 124 and functions of the image processing module 126 are discussed in more detail at least in FIGS. 2-10.

The tag data 134 may be sent to another system, such as a server 136 that provides at least part of the functionality of an inventory management system 138. For example, the tag data 134 may comprise data indicative of a SKU number. Based on information such as a previously determined location of the camera 118, the inventory management system 138 may determine that an item 102 with that SKU number is present at that location. The inventory management system 138 is discussed in more detail at least in FIGS. 11-12.

The detection system 122 and the item 102 may be configured such that sunlight is not impinging upon the camera 118. For example, the detection system 122 may be located indoors.

Figure 2:
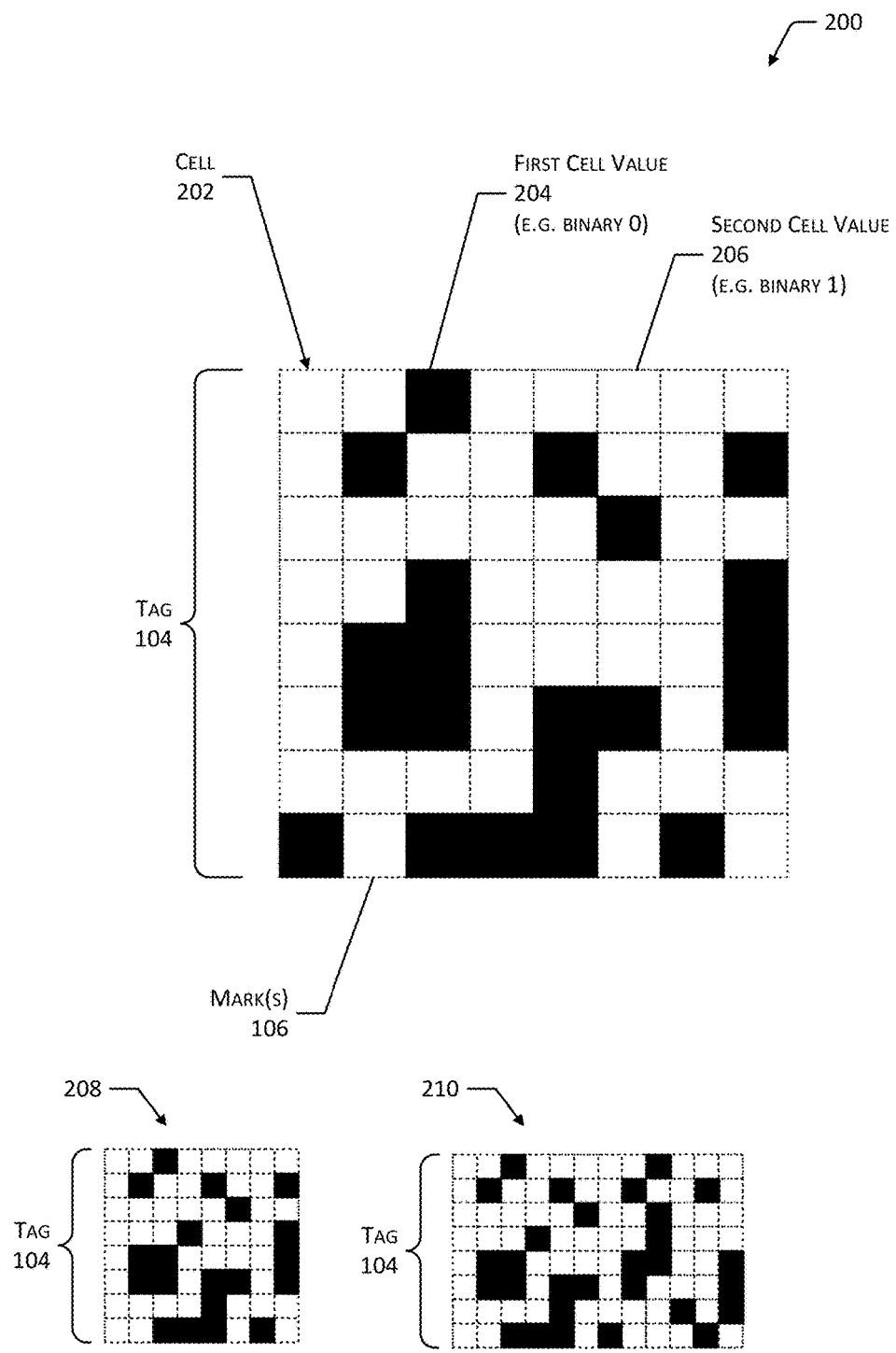
FIG. 2 illustrates a tag and the marks that are used to encode data, according to some implementations.

FIG. 2 is an illustration 200 of a tag 104 and the marks 106 that are used to encode tag data 134, according to some implementations. The tag 104 is depicted as it would appear when illuminated by the light source 110 and based on the emission photons 114. For example, the presentation of the tag 104 shown here is that when viewed at a particular infrared wavelength of the emission photons 114.

In this illustration the tag 104 is comprised of cells 202. Each cell 202 may be square, having a height and width that are at least approximately equal. In other implementations, each cell 202 may comprise a rectangle with differing height and width. The cells 202 may be arranged into a rectangle. For example, the tag 104 in this illustration comprises an 8×8 two-dimensional array of cells 202. Each cell 202 contains or comprises a mark 106 that is representative of either a first cell value 204 or a second cell value 206. In this illustration the first cell value 204 is depicted as a black square and is representative of a binary "0" while the second cell value 206 is depicted as a white square and is representative of a binary "1". In other implementations this arrangement may be inverted, such that white is representative of a binary "0". While only two cell values, depicted as black and white, are shown, it is understood that in other implementations other values may be used. For example, a mark 106 may be made using a fluorescent material that produces a stimulation photon 112 at a different wavelength, and thus appears as a different "color".

In some implementations the tag 104 may have particular cells 202 set to particular cell values. For example, as shown at 208, each cell 202 located at a corner of the tag 104 may have a particular value. In other implementations, particular groups of cells 202 may have particular values. For example, four cells 202 in a row may have a particular value. These particular cells 202 may be used to facilitate discovery of the corners of the tag 104, determine orientation of the tag 104, and so forth.

The tag 104 may be rectangular having more columns than rows. For example, as shown at 210 the tag 104 may have 8 rows and 12 columns of cells 202. In other implementations other arrangements of cells 202 may be used.

The marks 106 in this illustration are depicted as squares, but in other implementations the marks may have other shapes. For example, a mark 106 may comprise a circle or triangle that is within the boundaries of a particular cell 202.

Figure 3:
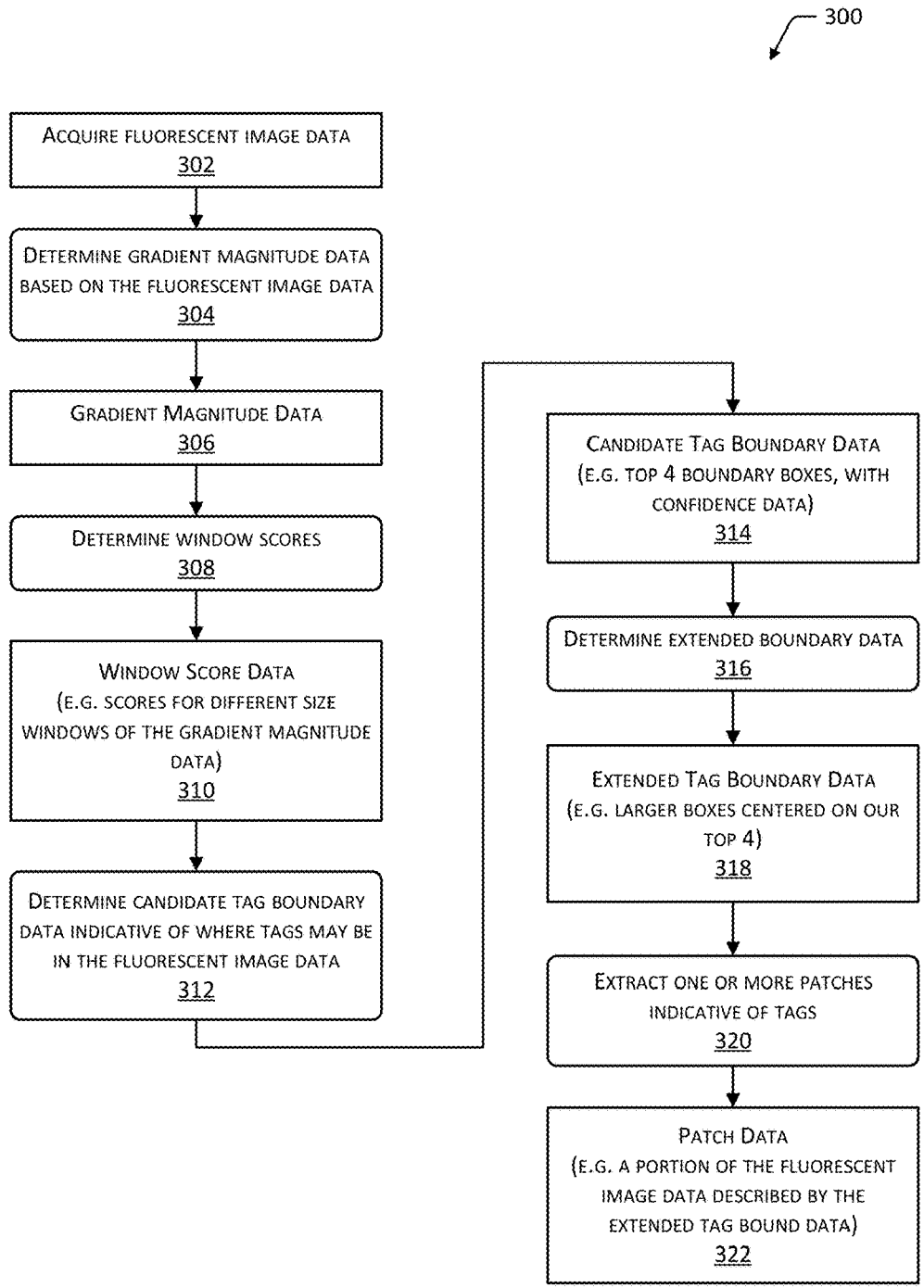
FIG. 3 is a flow diagram of a process to locate and produce patch data that includes a representation of a tag that is depicted within the fluorescent image data, according to some implementations.
Figure 4:
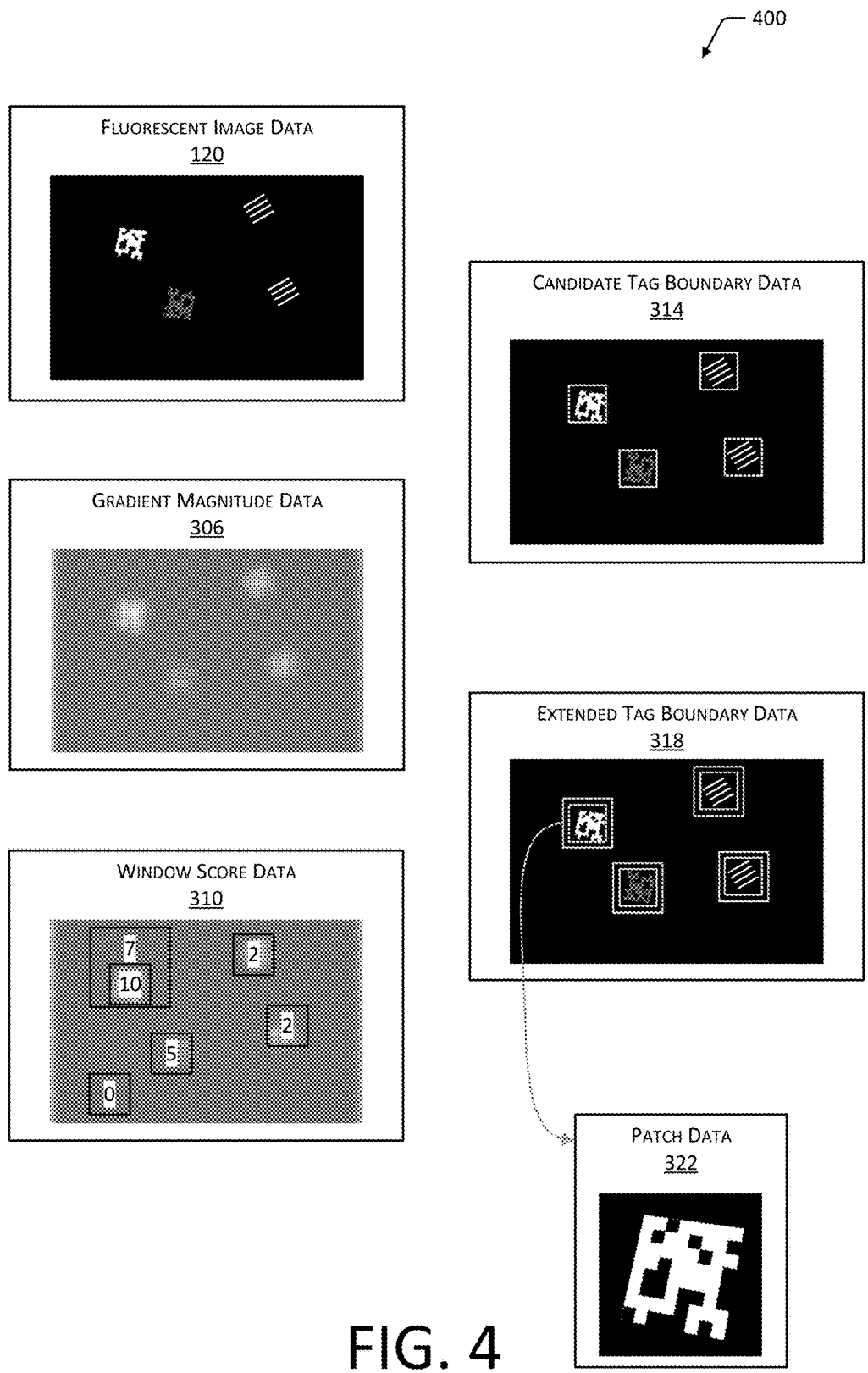
FIG. 4 illustrates some of the data associated with the process of FIG. 3, according to some implementations.

FIG. 3 is a flow diagram 300 of a process to locate and produce patch data that includes a representation of a tag 104 that is depicted within the fluorescent image data 120, according to some implementations. The process may be implemented at least in part by the locate module 128 executing at least in part on the computing device 124. Illustrations of some of the data referenced in FIG. 3 is depicted in FIG. 4.

At 302, fluorescent image data (FID) 120 is acquired. For example, the camera 118 may generate the FID 120 and send this data to the computing device 124.

At 304, gradient magnitude data 306 is determined, based on the FID 120. For example, the FID 120 may comprise a monochrome bitmap in which intensity data is represented for each pixel. The gradient magnitude data 306 may be determined by computing a gradient magnitude value for each pixel using the intensity data from the FID 120. The gradient magnitude data 306 provides information about how quickly there are changes in intensity between pixels in the image and a direction of those changes. The gradient magnitude value for a particular pixel may be represented as a vector value, having a magnitude and a direction or orientation. The gradient magnitude data 306 is useful as it provides information about where there are changes in the image and provides an indication of how abrupt that change is. As a result, features such as edges of a tag 104 may become readily apparent in the gradient magnitude domain.

In one implementation, the gradient magnitude data 306 may be calculated using a Sobel-Feldman operator. Using the Sobel-Feldman operator, an approximation of the gradient of the intensity of the FID 120 may be determined, producing the gradient magnitude data 306. This operator convolves the FID 120 with an integer-valued filter in the horizontal direction (along rows) and vertical direction (along columns) of the FID 120. In other implementations, other techniques may be used to determine the gradient magnitude data 306.

At 308, the gradient magnitude data 306 is processed using a sliding window function to determine scores for a plurality of windows. The sliding window function utilizes windows of varying sizes, and then "slides" or progressively scans that window across the gradient magnitude data 306. At each increment of the window's progression, window score data 310 for a particular window is determined. In one implementation, the window score for a particular window may be calculated using equation 1.

$$\text{Window Score} = I - (\lambda * A)$$

where I is a sum of gradient magnitude values for all pixels within the window, $\lambda$ is a penalization factor, and A is the area of the window (such as measured in pixels). In some implementations the penalization factor may comprise a predefined value.
Equation 1

The penalization factor prevents the window scoring from returning a result in which the entire image has the maximum intensity sum. Computational efficiency of this algorithm may be improved by using a summed-area table, also known as an integral image, over the gradient magnitude data 306.

The size (also known as "scale") of the window may vary between a minimum window size and a maximum window size. The minimum window size may be predetermined, based on the minimum number of pixels in the FID 120 that are needed to determine the tag data 134. For example, the minimum window size may be used to avoid calculating windows that would provide insufficient resolution to decode the tag 104. The maximum window size may be limited to the maximum size of the FID 120. As shown in FIG. 4, some of the calculated windows are depicted. For ease of illustration, and not by way of limitation, overlapping windows are not shown.

At 312, candidate tag boundary data 314 indicative of candidate windows is determined based on the window score data 310. In one implementation, those windows having the top k non-maxima suppressed window scores may be selected as candidate windows, where k is a specified integer value. It may be assumed that only a single window in a region will include the image of the tag 104. For the non-maxima suppression, the system begins with the window having the greatest window score, and then suppresses those pixels in the gradient magnitude data 306 around that window because it is considered known that only one window will be in that region of the image. The process may then proceed to select the next highest remaining window, based on window score, and repeat the process. The boundaries described by the remaining windows, or top n remaining candidate windows, are used to describe the boundary of possible tag locations in the FID 120. These boundaries are expressed as candidate tag boundary data 314 representative of rectangles associated with an area within the FID 120. For example, as shown in FIG. 4, the candidate tag boundary data 314 is indicative of boundary boxes around features in the FID 120 that may be tags 104. In some implementations the candidate tag boundary data 314 may include other data, such as the window score associated with a particular boundary. In another implementation, the windows having window score data 310 indicative of a score above a threshold value may be selected.

In some implementations prior to generation of the candidate tag boundary data 314 the portion of FID 120 designated by the window may be tested to determine if a tag 104 is likely to be present. If a tag 104 is deemed likely to be present, then the candidate tag boundary data 314 may be generated. If no tag 104 is deemed likely to be present in the window, then the data associated with that window may not be processed further. For example, a histogram of gradient orientations may be determined for the portion of the FID 120 designated by the window. This process is discussed in more detail below with regard to FIG. 9. If the histogram indicates peaks that exhibit angles approximately opposite one another, a tag 104 may be deemed likely to be present.

At 316 extended boundary data 318 is determined. Under some circumstances, the window scoring described above may result in determining windows, and subsequently candidate tag boundary data 314, that are smaller than the tag 104 as presented in the image. To avoid unwanted cropping of the image of the tag 104, the extended tag boundary data 318 may be determined. The extended tag boundary data 318 may be determined by applying a scaling factor to generate a boundary that is larger in area than that described in the candidate tag boundary data 314. For example, if the candidate tab boundary data 314 for a particular region is a first rectangle 180×180 pixels, the extended tag boundary data 318 may be a second rectangle that is 200×200 pixels. For example, as shown in FIG. 4, the extended tag boundary data 318 shows the increased size of the boundaries compared to the original candidate tag boundaries shown.

The scaling factor may be predetermined or may be dynamically adjusted. For example, during a setup phase or regular operation of the system, a failure to determine valid tag data 134 may result in the scaling factor being increased, and the process returning to 308. In other implementations, this step may be omitted.

At 320, patch data 322 is extracted from the FID 120. The patch data 322 is a portion of the FID 120 that, as indicated by the extended tag boundary data 318, may contain a tag 104. One or more patches of patch data 322 may be extracted from a single FID 120. For example, as shown in FIG. 4, four patches of patch data 322 may be extracted. Continuing the example above, the patch data 322 containing the tag 104 may comprise a 200×200 pixel portion of the FID 120.

The patch data 322 may then be subsequently processed by the image rectification module 130, as described below.

Figure 5:
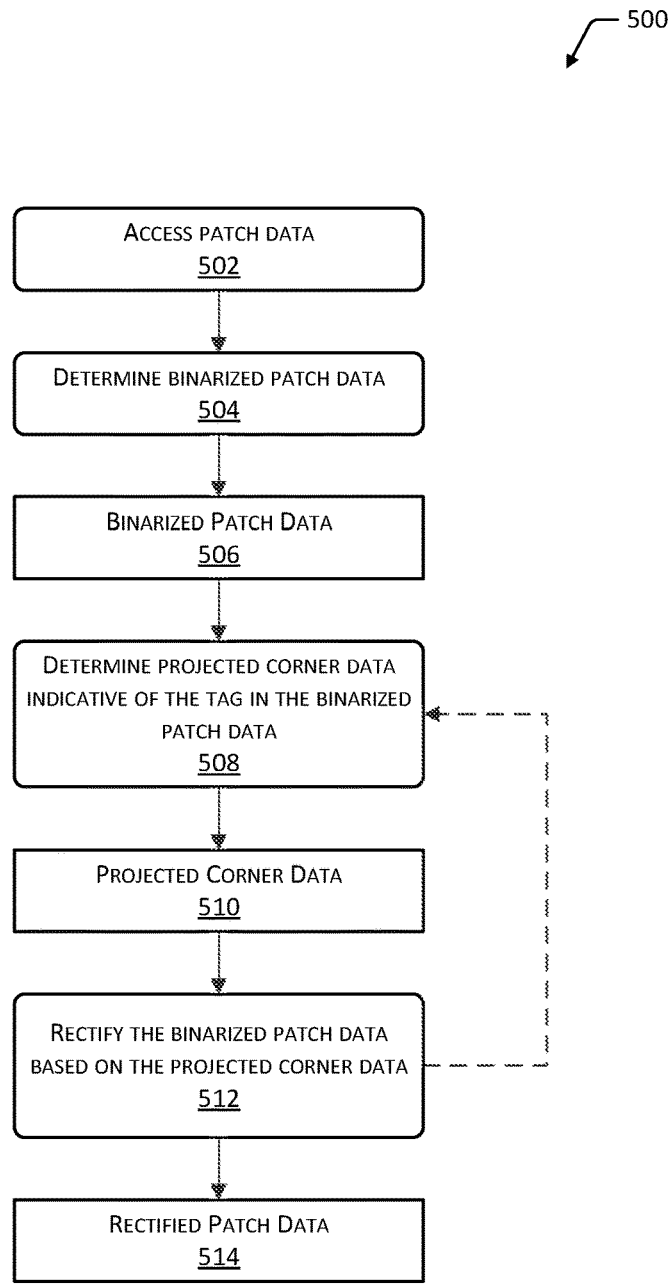
FIG. 5 is a flow diagram of a process to rectify the patch data to provide rectified patch data, according to some implementations.
Figure 6:
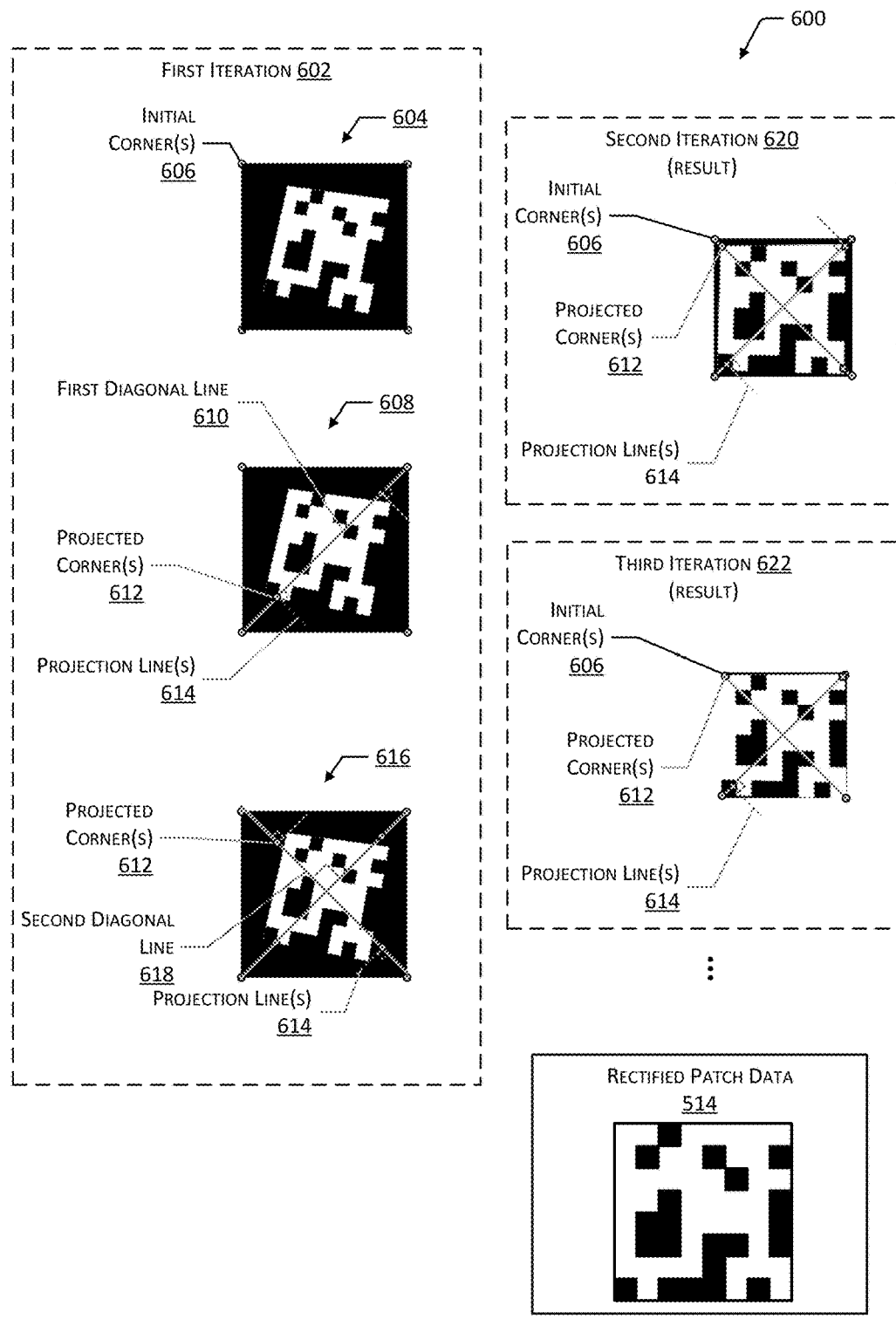
FIG. 6 illustrates several iterations of a process for determining the rectified patch data, according to some implementations.

FIG. 5 is a flow diagram 500 of a process to rectify the patch data to provide rectified patch data, according to some implementations. The process may be implemented at least in part by the image rectification module 130 executing at least in part on the computing device 124. Illustrations of a portion of the process involving iteration of the determination of projected corners is depicted in FIG. 6.

At 502, patch data 322 is accessed. For example, the locate module 128 may store the patch data 322 in memory where it is subsequently retrieved.

At 504, binarized patch data 506 ("binarized data") is determined using the patch data 322. The binarization converts the pixel values in the patch data 322 to binary values. For example, an 8-bit grayscale intensity value of a pixel in the patch data 322 is converted to a single bit value. In one implementation, the binarization may be accomplished using Otsu's method. For example, the two-dimensional Otsu's method may be used to generate the values of each pixel in the binarized patch data 506.

At 508, projected corner data 510 of the tag 104 are determined in the binarized patch data 506. The projected corner data 510 comprises four sets of coordinates that are indicative of where a possible corner of the tag 104 is located. The coordinates may be given with respect to an origin specific to the patch data 322, an origin specific to the FID 120, or other origin deemed convenient. In one implementation, the projected corner data 510 may be generated through one or more iterations of the following process illustrated in FIG. 6. In other implementations, other techniques may be used.

At 512, rectified patch data 514 ("rectified data") is generated based on the binarized path data 506 and the projected corner data 510. The rectification may comprise applying a transformation to the patch data 322 such that the four corners indicated in the projected corner data 510 form a rectangle. This transformation may be visualized as leaving the content of the individual values of the pixels unchanged but deforming a grid which those pixels inhabit. This deformed grid may then be used to map a particular pixel value at a particular set of coordinates in the patch data 322 to a new set of coordinates in the rectified patch data 514. For example, in the OpenCV environment (promulgated at opencv.org) the getPerspectiveTransform function may be used to generate the rectified patch data 514 using the projected corner data 510 and the patch data 322 as inputs. Visually, the patch data 322 may be an image of the tag 104 that is askew or appears to be tilted. In comparison, the rectified patch data 514 contains a representation of the tag 104 in which perspective effects are below a threshold value. In one implementation, perspective effect may be determined by calculating an apparent angular deviation between a plane of the tag 104 and a plane that is orthonormal to an image plane of a camera that captured the image. In another implementation, the perspective effect may be determined by finding one or more features of the tag 104 and determining a variance between those features. For example, the features may be straight edges of the tag 104, and the variance may be measurement of an angle between two adjacent edges. If an angle at a vertex of two adjacent sides of a rectangular tag is 88 degrees, and the threshold is that the angle must be between 85 and 95 degrees, the image may be determined to be rectified.

As a result of rectification, the appearance of the tag 104 in the rectified patch data 514 appears as if the tag 104 was imaged with a camera 118 having a center of an optical axis of that camera 118 centered on the tag 104 and that optical axis being perpendicular to a plane of the tag 104. For example, the rectified patch data 514 is a close representation of the tag 104 as it appears on the item 102. In implementations where the tag 104 is rectangular, opposite edges of the tag 104 within the rectified patch data 514 will be approximately parallel and the corners between adjacent edges would be approximately 90 degrees. The rectified patch data 514 may then subsequently be processed by the readout module 132, as described below.

Other techniques may be included as part of the determination of the rectified patch data 514. For example, an alignment process may be used to align the binarized patch data 506 such that cells 202 of the tag 104 are aligned with the axes associated with the binarized patch data 506, such as rows and columns of the image. In one implementation, a histogram of gradients may be determined for the binarized patch data 506. This histogram may be visualized as a chart in which a first axis indicates the various angles (or ranges of angles) and a second axis indicates the number of gradient vectors in the image that exhibit that angle. The histogram bin for the angle exhibiting a maximum value indicates the orientation of the code. Once known, the image data may be rotated based on this angle.

It may be advantageous to crop the image under some circumstances. For example, the binarized patch data 506 may be cropped such that areas in the image that do not include marks 106 are reduced. In one implementation horizontal and vertical gradients from an image may be determined. For example, the binarized patch data 506 aligned as described above may be used as an input. A Hough transform algorithm may be modified to use the gradient magnitudes and determine edges associated with the marks 106 in the tag 104. Those lines that are within a threshold range with respect to the axes of the images may be considered. For example, lines that are within +5 and −5 degrees of vertical (with respect to the image axes) and +5 and −5 degrees of horizontal (with respect to the image axes) may be retained and subsequently used. A comb filter or template that accommodates the number of rows, columns, or rows and columns of the tag 104 may be used to isolate the boundaries of the tag 104. For example, the tag 104 as depicted in FIG. 2 comprises an 8×8 matrix. As a result, a comb filter with 9 spikes (thus delineating 8 columns) may be used to determine the boundary of the tag 104.

In some implementations another technique may be used to generate the rectified patch data 514. Use of the Hough transform algorithm to determine the edges of the marks 106 as described above provides information that may be used to determine initial corner data. For example, where the outer edges of the tag 104 intersect may designate a rough corner. The four Hough lines that bound the tag 104 thus provide four initial corners.

The binarized patch data 506 may be processed using a technique similar to that described above with respect to 508. However, instead of using the corners of the image as the initial corners, the rough corners designated by the Hough transform algorithm may be used. Diagonal lines may then be extended between opposing corners, and the location of the projection of the first and last pixels associated with marks 106 along these diagonal lines may then be subsequently designated as projected corners. These points correspond to the point on the line that has the maximum dot product. This processing may be iterated until a suitably rectified image is obtained. For example, as described above, iteration may be completed when the difference between the position of subsequent projected corners is below a threshold value.

FIG. 6 illustrates several iterations 600 of a process for determining the rectified patch data 514, according to some implementations. Iterations may be performed at least in part by the image rectification module 130 executing at least in part on the computing device 124.

A first iteration is shown at 602. At 604, at least two opposing initial corners 606 of the patch data 322 are designated. For example, a first initial corner 606 and a second initial corner 606 may be designated. These initial corners 606 may correspond to the corners of the patch data 322.

At 608, a first diagonal line 610 is designated between the first initial corner 606 and the second initial corner 606. A first projected corner 612 and a second projected corner 612 are determined. The projected corners are determined by finding the point along the line at which a perpendicular line extending from that point on the line intersects a pixel having a particular pixel value. In this illustration, projection lines 614 are shown extending perpendicularly away from the first diagonal line 610. For example, a first projected corner 612 may be determined by finding a first point on the first diagonal line 610 at which a first pixel having a particular value is projected onto the line. If the projection line 614 is visualized as being perpendicular to the first diagonal line 610, and that line is slid along the length of the first diagonal line 610, the first projected corner 612 would be the first point on that line at which the perpendicular line encounters a white pixel. Likewise, a second projected corner 612 may be determined at a second point on the first diagonal line 610 at which a last pixel having the particular value of pixel is projected onto the first diagonal line 610. Continuing the example, the second projected corner 612 would be the last point on the first diagonal line 610 at which the perpendicular projection line 614 that is slid along the length of the first diagonal line 610 encounters a white pixel. In other implementations, other projection techniques may be used. While the pixels are described as having a 1 bit value, such as either 0 or 1, in other implementations the particular pixel value may be some other value. For example, if the values of pixels are expressed using 8 bits, the particular pixel value may be some 8 bit value.

At 616, a second diagonal line 618 is designated that extends perpendicularly from a midpoint of a line extending from the first projected corner 612 to the second projected corner 612. As depicted here, the second diagonal line 618 may not align with the initial corners 606.

A third projected corner 612 and a fourth projected corner 612 are then determined, as described above with regard to the first and second projected corners 612. The projected corner data 510 now includes four sets of coordinates, each set designating a projected corner 612 of the tag 104 as depicted in the patch data 322.

The rectification process described above with regard to 512 may be used. For example, a transformation function may be used to process the patch data 322 using the projected corners 612 indicated in the projected corner data 510 to generate intermediate patch data. The intermediate patch data may then be iterated using the process described above to determine a new set of projected corner data 510.

At 620, the result of a second iteration is shown. The projected corners 612 from this iteration have moved relative to the results of the first iteration 602, while the overall distortion of the tag 104 is lessened.

Similarly, at 622 the result of a third iteration is shown. The projected corners 612 from this iteration have moved relative to the results of the second iteration 620, but the movement is less. Some of the initial corners 606 and projected corners 612 are very close to one another, or at the same coordinates. The process may iterate until differences between the position of subsequent projected corners 612 either remains the same or falls below a threshold value, at which time the iteration may cease with the resulting output comprising the rectified patch data 514.

In this illustration, the tag 104 includes cells at three corners that exhibit a second cell value 206, making them visible in the FID 120. In other implementations cells in all four corners of the tag 104 may exhibit the second cell value 206, such as shown at 208.

In some implementations other transformations may be applied. For example, the patch data 322 or intermediate patch data may be rotated to align the rows and columns of the marks 106 to be parallel with the rows and columns of the patch data 322 or intermediate patch data.

Figure 7:
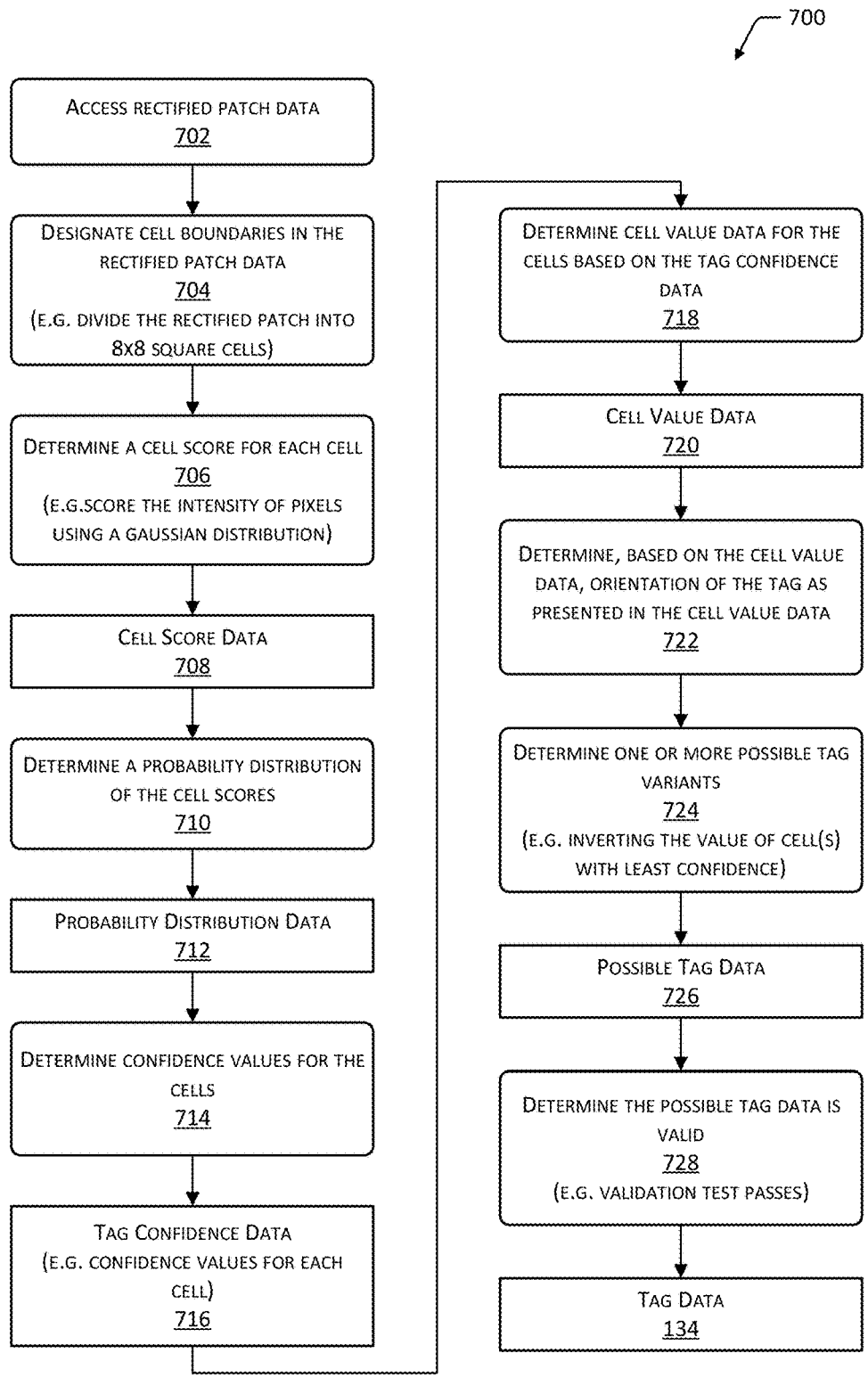
FIG. 7 illustrates a flow diagram of a process to use the rectified patch data to determine tag data, according to some implementations.

FIG. 7 illustrates a flow diagram 700 of a process to use the rectified patch data to determine tag data, according to some implementations. The process may be implemented at least in part by the readout module 132 executing at least in part on the computing device 124.

At 702, rectified patch data 514 is accessed. For example, the image rectification module 130 may store the rectified patch data 514 in memory where it is subsequently retrieved.

At 704, cell boundaries are designated in the rectified patch data 514. Information about the tag 104 may be retrieved that indicates the tag 104 is composed of marks arranged in x rows and y columns. This information may be retrieved and used to determine the cell boundaries. For example, given that the tag 104 is known to comprise an 8×8 grid of squares, the rectified patch data 514 may be divided into a predetermined grid of cells that contains 8 rows and 8 columns of cells 202.

At 706, cell score data 708 is produced that comprises a cell score that is determined for each cell 202. The cell score for each cell 202 may be determined by convolving the pixel values in the rectified patch data 514. In one implementation a Gaussian filter may be used to convolve the pixel values in each of the respective cells 202 as indicated by the designated cell boundaries. This filter has the effect of applying greater weight to the pixel values in the center of the cell 202 and less weight to the pixel values near the perimeter of the cell 202. In other implementations, other filters or techniques may be used.

At 710, the cell score data 708 is processed to determine probability distribution data 712. The probability distribution data 712 includes a different model for each possible cell value that the tag 104 may include to encode data. For example, the tag 104 as described in FIG. 2 may include a first cell value 204 (black) and a second cell value 206 (white). Thus, the probability distribution data 712 would be indicative of two different models, one for black and one for white.

In one implementation the models may be Gaussian. For example, a first model for the second cell value 206 (white) may involve a Gaussian model being initialized with the highest cell score found in the cell score data 708. The lowest cell score is then found in the cell score data 708 and used to initialize a second model for the first cell value 204 (black). The process may continue, iterating to the next highest and next lowest scores being added to the respective models. The mean and variance of each model is updated accordingly. The resulting Gaussian models comprise the probability distribution data 712.

At 714, tag confidence data 716 comprising the confidence values for each of the cells 202 is determined. The cell score data 708 may be processed using the models expressed in the probability distribution data 712 to determine that the cell is representative of either a first cell value 204 or a second cell value 206. The confidence value may be based on a first probability value and a second probability value. For example, the confidence value may be calculated using the following equation:

$$\text{Confidence value of a cell} = \log\left(\frac{P1(x)}{P2(x)}\right)$$

where x is the cell score for a particular cell, P1 is a first probability value obtained using a first model indicative of a probability that the cell is white given the value of x and P2 is a second probability value obtained using a second model indicative of a probability that the cell is black given the value of x.
Equation 2

At 718, cell value data 720 is determined based on the tag confidence data 716. The cell value data 720 comprises data that is indicative of a cell value for each cell. The determination may comprise comparing the confidence value for each cell with a threshold value. For example, if the confidence value is a positive number, the cell 202 may be designated as having a cell value of 1. Continuing the example, if the confidence value is not a positive number, the cell 202 may be designated as having a cell value of 0.

The cell value data 720 now expresses a binary matrix representation of the tag. The cells 202 in the tag 104 are each associated with a single one of the cell values that are possible.

At 722, an orientation of the tag may be determined based on the cell value data 720. For example, the cell value data 720 may be assessed for the presence of particular cells or groups of cells that provide a pattern indicative of orientation. For example, one or more of the cells 202 may be designated to act as special bits. For example, the corners of the tag 104 may always be designated as having a second cell value 206, such that they will be visible within the FID 120. Continuing the example, specific cells 202 may be designated as having the first cell value 204 to provide cues as to orientation. These special bits may then be used to determine if the tag 104 as represented in the cell value data 720 is in a particular orientation. In some implementations, the determination of the orientation may include allowance for potentially misinterpreted cells 202. For example, the tag 104 may be intended to have four special bits, each bit expressed as a particular cell value at a particular cell location. The determination of the orientation may be made using any three of these bits, allowing for one incorrect bit. If two incorrect special bits are found, the tag 104 may be deemed to be unreadable. In other implementations a different number of special bits may be deemed permissible.

Once the orientation is determined, the cell value data 720 may be rotated into a particular orientation for further processing. For example, if the cell value data 720 is found to have an orientation of 90 degrees, the cell value data 720 may then be rotated by −90 degrees to produce an orientation of zero degrees.

If the cell value data 720 is deemed to be representative of a valid tag 104, the cell value data 720 may then be decoded to produce the tag data 134. For example, the cell value data 720 may be determined to be valid by calculating a check digit or by other validation techniques to determine if the tag 104 is readable. In another example, the cell value data 720 may be determined valid if decoding results in data which one or more of conforms to a predetermined format, exhibits values within a specified range, and so forth. If valid, the cell value data 720 is decoded to provide the tag data 134. If the cell value data 720 is not determined to be valid, the process may proceed to 724.

At 724, possible tag data 726 indicative of one or more possible tag variants is determined. For example, tag confidence data 716 may be accessed to determine a set of one or more cells for which the respective confidence value is below a threshold value. For example, the n cells 202 with the lowest confidence values may be determined. The possible tag data 726 may be generated by inverting the value of one or more of the n cells 202. For example, if n=1 and a particular cell 202 with the lowest confidence value has a value of 0, the possible tag data 726 is generated using the cell value data 720 but instead the particular cell 202 is assigned a value of 1. Several variations of possible tag data 726 may be generated and then subsequently checked to determine if they are valid.

At 728, the possible tag data 726 that includes the one or more inverted cell values, is determined to be valid. For example, the possible tag data 726 may be processed to calculate a check digit, and the check digit may be deemed correct, indicating a valid code. Once the possible tag data 726 is deemed to be valid, it is decoded to produce the tag data 134.

Figure 8:
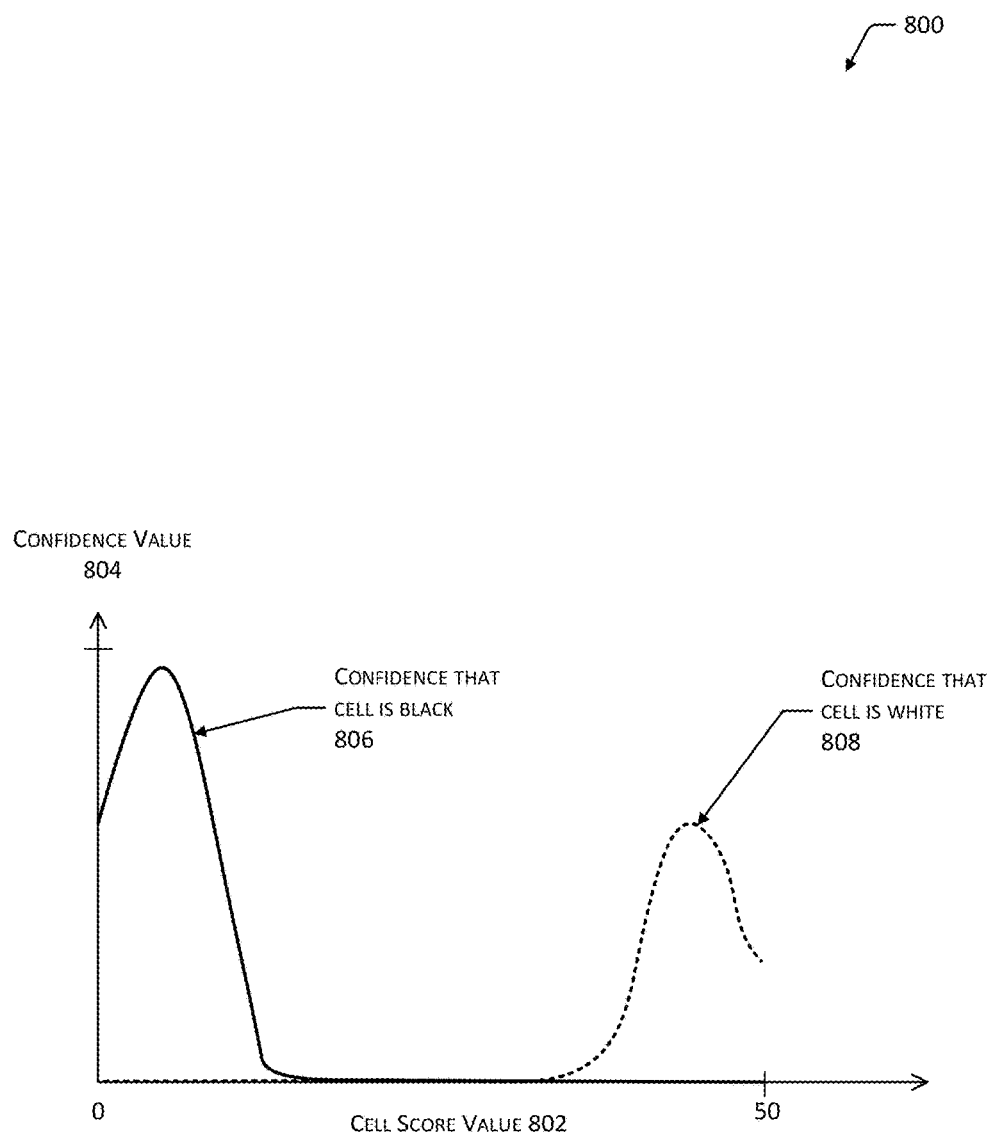
FIG. 8 illustrates a graph of a probability distribution function associated with the value of a cell, according to some implementations.

FIG. 8 illustrates a graph 800 of a probability distribution associated with the value of a cell score, according to some implementations. As described above, cell score data 708 indicative of cell scores may be determined and used to generate probability distribution data 712. In this illustration, a horizontal axis indicates cell score values while a vertical axis indicates a confidence value. A first curve is indicative of a confidence that a cell is black 806 while a second curve is indicative of a confidence that a cell is white 808. Given an input of a cell score value, such as described above at 706, a confidence value 804 is provided as output.

By using the probability distribution data 712, the system is more tolerant to various changes in environment, tag quality, illumination, artifacts introduced due to data processing, and so forth. For example, a predetermined hard limit that specifies that a white cell 202 is one that has an 8-bit intensity value greater than 192 may experience problems with readout in the event that the marks 106 on the tag 104 have degraded and produce fewer emission photons 114. In comparison, by using the probability distribution data 712, the system is more robust and able to operate under varying conditions.

Figure 9:
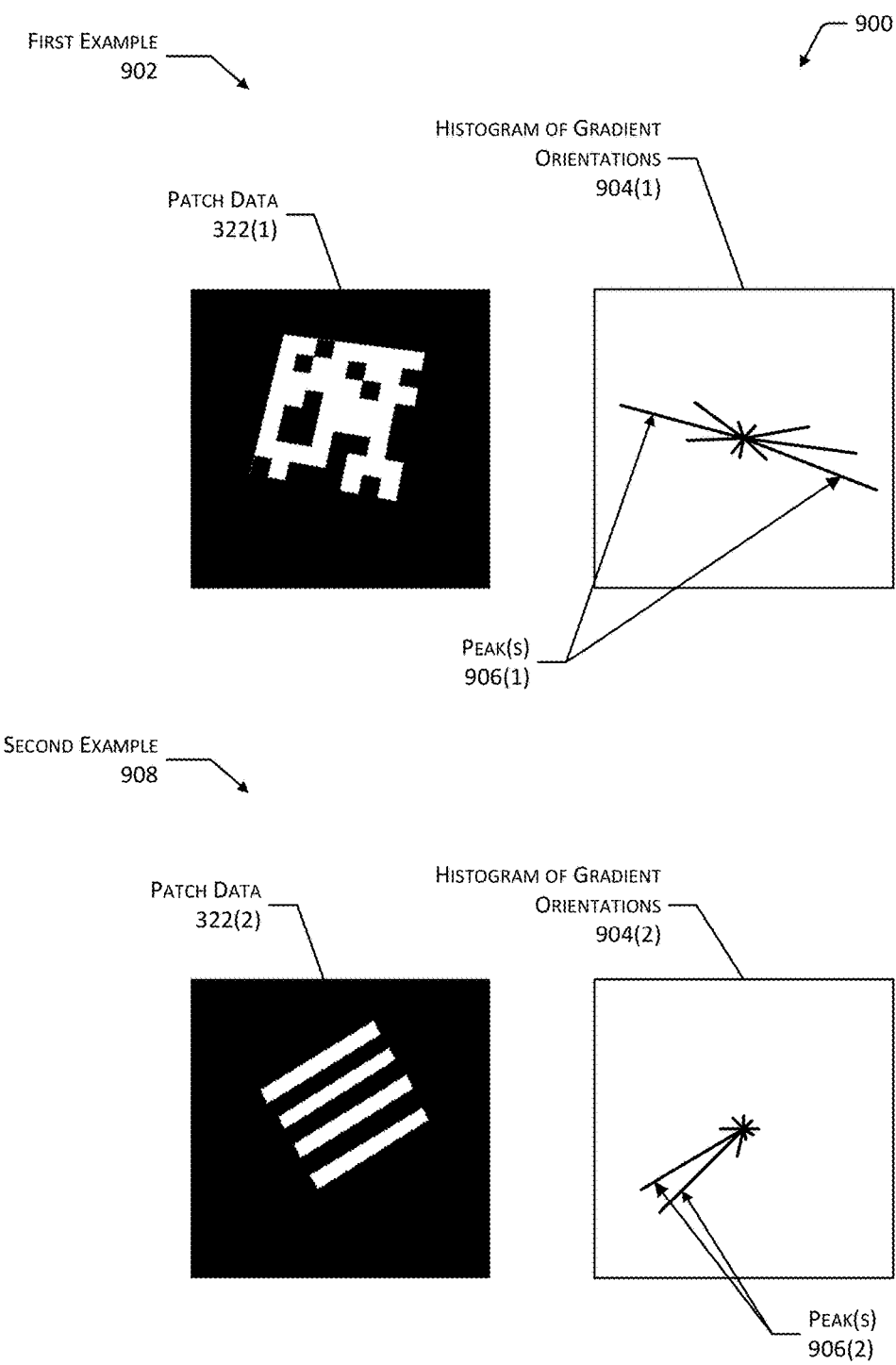
FIG. 9 illustrates two examples of using a histogram of gradient orientations to determine if a portion of the fluorescent image data contains a tag or not, according to some implementations.

FIG. 9 illustrates two examples 900 of using a histogram of gradient orientations to determine if a portion of the fluorescent image data 120 contains a tag 104 or not, according to some implementations.

The process described in FIG. 3 may include an additional test to determine if data is representative of a tag 104. For example, once the candidate tag boundary data 314 has been determined, those areas deemed to not include tags 104 may be discarded for subsequent processing. In another example, the patch data 322 may be processed and those patches deemed to not include tags 104 may be discarded for subsequent processing. By removing this data from consideration, improvements may be realized in reducing latency, reducing demands for computation and memory consumption, and so forth.

As described above in FIG. 2, the tags 104 comprise an arrangement of cells 202. Each cell 202 may have a particular mark 106 that is used to represent a particular value. Other features that may appear in the FID 120 may include the overhead lights 108 or reflections of the overhead lights 108, windows, and so forth. To determine if a region of the FID 120 includes a tag 104, a histogram of gradient orientations may be determined. The gradient magnitude values based on intensity values of pixels within the region are calculated. A gradient orientation of at least a portion of the pixels in the region is determined based on the gradient magnitude values. In one implementation, the region tested may comprise a window that comprises a portion of the FID 120, such as patch data 322. The gradient orientations along the X and Y axes of the window of the FID 120 or the patch data 322 or other subsets of the FID 120 are calculated, and a histogram is created of these orientations.

A first example 902 is illustrated here of patch data 322(1) that includes an image of a tag 104. Also shown is a histogram of gradient orientations 904(1) based on the patch data 322(1). The histogram exhibits two peaks 906(1), that are approximately opposite one another. This arrangement of peaks in the histogram that correspond to angles or orientations that are greater than a threshold value from one another is suggestive of a presence of a tag 104 in the patch data 322(1). This pattern of peaks results from the gradients produced by the grid arrangement of the marks 106 and the variation between white and black.

In comparison, a second example 908 depicts a reflection of the overhead lights 108 that has been captured by the camera 118 and is visible in the FID 120 and subsequent patch data 322(2). A histogram of gradient orientations 904(2) for this patch exhibits a different distribution, in which the orientations of the two peaks are less than the threshold value from one another. In this example, two peaks 906(2) are apparent, but the angle between these peaks is below the threshold value because the two peaks are relatively close to one another.

In one implementation, a score indicative of the peaks and their relative angular separation may be calculated using the following:

$$R = \det M - k(\operatorname{trace} M)^2$$

where $\det M = \lambda_1 \lambda_2$ and $\operatorname{trace} M = \lambda_1 + \lambda_2$ Equation 3

As shown in Equation 3, the score R is high when the eigenvalues $\lambda_1 \approx \lambda_2$ and both $\lambda_1$ and $\lambda_2$ are large. By using equation 3, the histogram of gradient orientation data may be scored, and compared to a threshold value. If the score R is greater than a threshold value, the portion in the patch data 322 may be deemed to contain a tag 104.

By assessing the histogram of gradient orientations 904, data that is not representative of a tag 104 may be determined and then discarded. As a result, overall efficiency of the system is improved.

Figure 10:
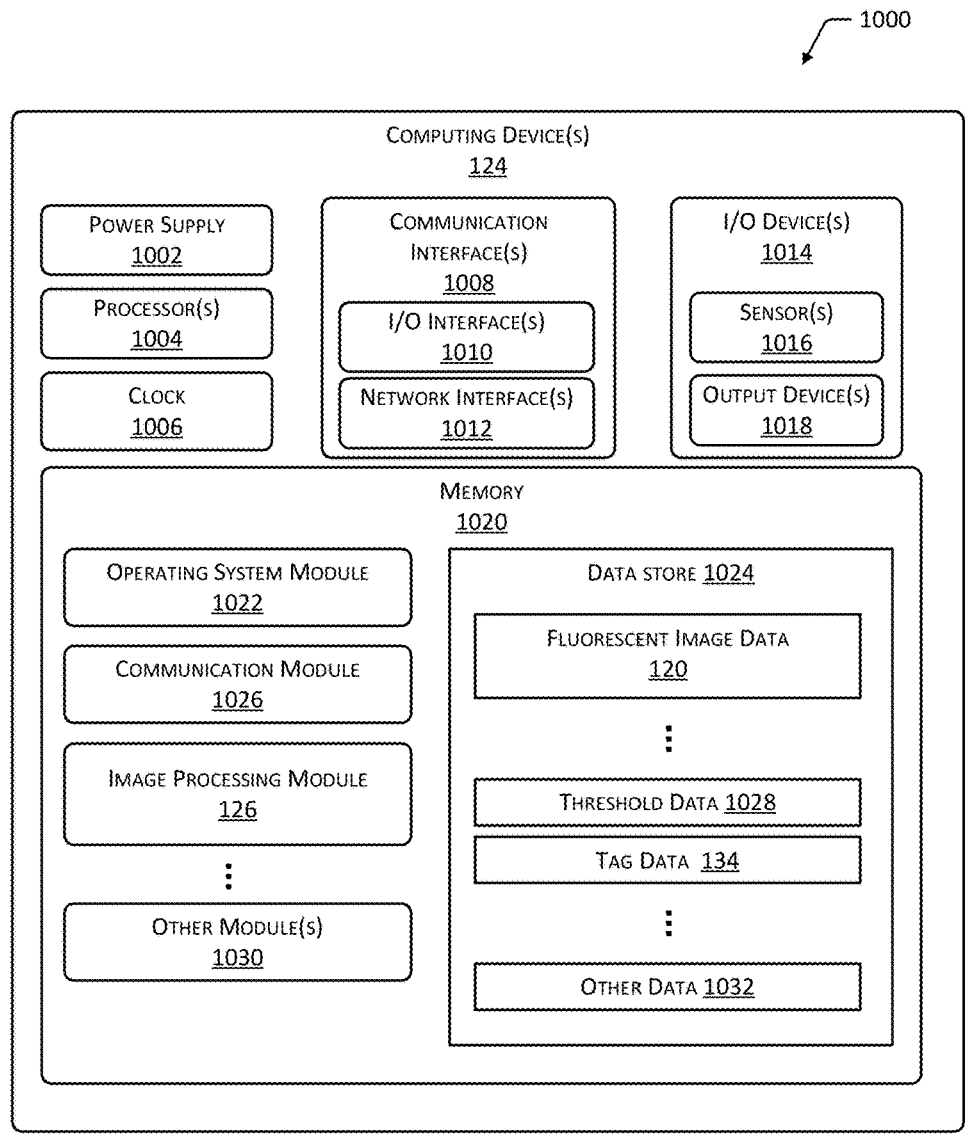
FIG. 10 is a block diagram of a computing device to generate tag data, according to some implementations.

FIG. 10 illustrates a block diagram 1000 of the computing device 124 configured to implement the image processing module 126, according to some implementations. The computing device 124 may be physically present at the facility, may be accessible by a network, or a combination of both.

One or more power supplies 1002 may be configured to provide electrical power suitable for operating the components in the computing device 124. The one or more power supplies 1002 may comprise batteries, capacitors, fuel cells, photovoltaic cells, wireless power receivers, conductive couplings suitable for attachment to an external power source such as provided by an electric utility, and so forth. The computing device 124 may include one or more hardware processors 1004 (processors) configured to execute one or more stored instructions. The processors 1004 may comprise one or more cores. One or more clocks 1006 may provide information indicative of date, time, ticks, and so forth. For example, the processor 1004 may use data from the clock 1006 to associate a particular interaction with a particular point in time.

The computing device 124 may include one or more communication interfaces 1008 such as input/output (I/O) interfaces 1010, network interfaces 1012, and so forth. The communication interfaces 1008 enable the computing device 124, or components thereof, to communicate with other devices or components. The communication interfaces 1008 may include one or more I/O interfaces 1010. The I/O interfaces 1010 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 1010 may couple to one or more I/O devices 1014. The I/O devices 1014 may include input devices such as one or more of a sensor 1016, keyboard, mouse, scanner, and so forth. For example, the sensor 1016 includes the camera 118. The I/O devices 1014 may also include output devices 1018 such as one or more of a display device, printer, audio speakers, and so forth. In some embodiments, the I/O devices 1014 may be physically incorporated with the computing device 124 or may be externally placed.

The network interfaces 1012 may be configured to provide communications between the computing device 124 and other devices, routers, access points, and so forth. The network interfaces 1012 may include devices configured to couple to personal area networks (PANs), local area networks (LANs), wireless local area networks (WLANS), wide area networks (WANs), and so forth. For example, the network interfaces 1012 may include devices compatible with Ethernet, Wi-Fi, Bluetooth, ZigBee, and so forth.

The computing device 124 may also include one or more busses or other internal communications hardware or software that allow for the transfer of data between the various modules and components of the computing device 124.

As shown in FIG. 10, the computing device 124 includes one or more memories 1020. The memory 1020 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 1020 provides storage of computer-readable instructions, data structures, program modules, and other data for the operation of the computing device 124. A few example functional modules are shown stored in the memory 1020, although the same functionality may alternatively be implemented in hardware, firmware, or as a system on a chip (SoC).

The memory 1020 may include at least one operating system (OS) module 1022. The OS module 1022 is configured to manage hardware resource devices such as the I/O interfaces 1010, the I/O devices 1014, the communication interfaces 1008, and provide various services to applications or modules executing on the processors 1004. The OS module 1022 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 1020 may be a data store 1024 and one or more of the following modules. These modules may be executed as foreground applications, background tasks, daemons, and so forth. The data store 1024 may use a flat file, database, linked list, tree, executable code, script, or other data structure to store information. In some implementations, the data store 1024 or a portion of the data store 1024 may be distributed across one or more other devices including servers, network attached storage devices, and so forth.

A communication module 1026 may be configured to establish communications with sensors 1016, output devices 1018, servers, or other devices. The communications may be authenticated, encrypted, and so forth.

The memory 1020 may store an image processing module 126 that is configured to generate tag data 134 based on FID 120 obtained from the camera 118.

Information used by the image processing module 126 may be stored in the data store 1024. For example, the data store 1024 may store the FID 120, threshold data 1028, tag data 134, so forth.

Other modules 1030 may also be present in the memory 1020 as well as other data 1032 in the data store 1024.

Figure 11:
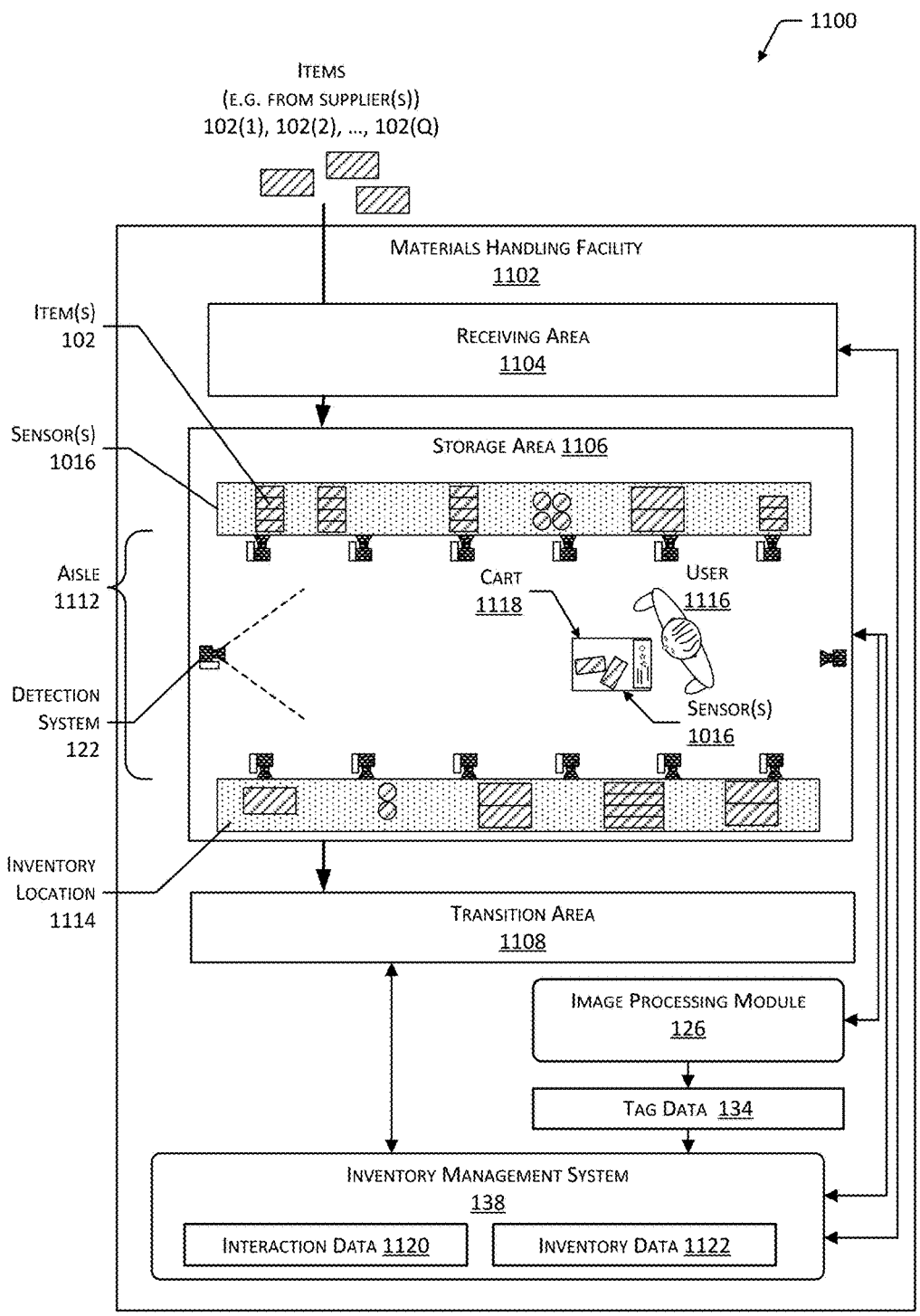
FIG. 11 is a block diagram illustrating a materials handling facility (facility) using the system, according to some implementations.

FIG. 11 is a block diagram 1100 illustrating a materials handling facility (facility) 1102 using the system 100, according to some implementations. A facility 1102 comprises one or more physical structures or areas within which one or more items 102(1), 110(2), . . . , 110(Q) may be held. As used in this disclosure, letters in parenthesis such as "(Q)" indicate an integer value greater than or equal to zero. The items 102 may comprise physical goods, such as books, pharmaceuticals, repair parts, electronic gear, and so forth.

The facility 1102 may include one or more areas designated for different functions with regard to inventory handling. In this illustration, the facility 1102 includes a receiving area 1104, a storage area 1106, and a transition area 1108.

The facility 1102 may be configured to receive different kinds of items 102 from various suppliers and to store them until a customer orders or retrieves one or more of the items 102. A general flow of items 102 through the facility 1102 is indicated by the arrows of FIG. 11. Specifically, as illustrated in this example, items 102 may be received from one or more suppliers, such as manufacturers, distributors, wholesalers, and so forth, at the receiving area 1104. In various implementations, the items 102 may include merchandise, commodities, perishables, or any suitable type of item 102, depending on the nature of the enterprise that operates the facility 1102. Upon being received from a supplier at the receiving area 1104, the items 102 may be prepared for storage in the storage area 1106. For example, in some implementations, items 102 may be unpacked or otherwise rearranged. The receiving area 1104 may be configured to accept items 102, such as from suppliers, for intake into the facility 1102. For example, the receiving area 1104 may include a loading dock at which trucks or other freight conveyances unload the items 102. After arriving through the receiving area 1104, items 102 may be stored within the storage area 1106. In some implementations, like items 102 may be stored or displayed together in the inventory locations 1114 such as in bins, on shelves, hanging from pegboards, and so forth. In this implementation, all items 102 of a given kind are stored in one inventory location 1114. In other implementations, like items 102 may be stored in different inventory locations 1114. For example, to optimize retrieval of certain items 102 having frequent turnover within a large physical facility 1102, those items 102 may be stored in several different inventory locations 1114 to reduce congestion that might occur at a single inventory location 1114.

In some implementations, the items 102 may be processed, such as at the receiving area 1104, to generate item data. For example, an item 102 may be weighed, imaged or otherwise scanned to develop reference images or representations of the item 102 at the receiving area 1104. In some implementations, the tag 104 on the item 102 may be read to identify the type of item during the receiving process. In one implementation, the items 102 may have the tags 104 applied in the receiving area 1104. In another implementation, the tags 104 may be applied by the manufacturer of the item 102, at a transshipment point, and so forth, and the items 102 may arrive with the tags 104 already applied.

The item data provides information about the characteristics of a particular type of item 102. These characteristics may include weight of the item 102 individually or in aggregate. For example, the item data may comprise information indicative of tag data 134 associated with an item 102, a weight of a single item 102, or a package, kit, or other grouping considered to be a single item 102. Other information such as weight distribution may also be stored.

The tag data 134 may include an item identifier. The item identifier may be used to distinguish one type of item 102 from another. For example, the item identifier may include a stock keeping unit (SKU) string, Universal Product Code (UPC) number, and so forth. The items 102 that are of the same type may be referred to by the same item identifier. For example, cans of beef flavor Brand X dog food may be represented by the item identifier value of "9811901181". In other implementations, non-fungible items 102 may each be provided with a unique item identifier, allowing each to be distinguished from one another.

The item data may include data about other characteristics, such as information about appearance for use in machine vision or manual recognition. For example, the item data may include sample images of the type of item 102, three-dimensional point cloud data for the item 102, and so forth. The sample image data may comprise one or more images of one or more of that type of item 102. For example, sample image data may be obtained during processing or intake of the item 102 to be used by the facility.

The item data may include other information about the appearance. For example, a plurality of local descriptor values may be generated by feature extraction algorithms, parameters for classifiers, neural network configuration data, and so forth, that characterizes the appearance of a representative of one or more of the item 102.

The item data may include geometry data. The geometry data may include information indicative of size and shape of the item 102 in one, two, or three dimensions. For example, the geometry data may include the overall shape of an item 102, such as a cuboid, sphere, cylinder, and so forth. The geometry data may also include information such as length, width, depth, and so forth, of the item 102. Dimensional information in the geometry data may be measured in pixels, centimeters, inches, arbitrary units, and so forth. The geometry data may be for a single item 102, or a package, kit, or other grouping considered to be a single item 102.

The item data may indicate the types and quantities of items 102 that are expected to be stored at that particular inventory location such as in a particular lane on a shelf. The item data may include one or more inventory location identifiers (IDs). The inventory location ID is indicative of a particular area or volume of an inventory location such as a shelf that is designated for stowage of the type of item 102. For example, a single shelf may have several lanes, each with a different inventory location ID. Each of the different inventory location IDs may be associated with a lane having a particular area on the shelf designated for storage of a particular type of item 102. A single type of item 102 may be associated with a particular inventory location ID, a plurality of inventory location IDs may be associated with the single type of item 102, more than one type of item 102 may be associated with the particular inventory location ID, and so forth.

The storage area 1106 is configured to store the items 102. The storage area 1106 may be arranged in various physical configurations. In one implementation, the storage area 1106 may include one or more aisles 1112. The aisle 1112 may be configured with, or defined by, inventory locations 1114 on one or both sides of the aisle 1112. The inventory locations 1114 may include one or more of a shelf, a rack, a case, a cabinet, a bin, a floor location, or other suitable storage mechanisms for holding, supporting, or storing the items 102. For example, the inventory locations 1114 may comprise shelves with lanes designated therein. The inventory locations 1114 may be affixed to the floor or another portion of the structure of the facility 1102. The inventory locations 1114 may also be movable such that the arrangement of aisles 1112 may be reconfigurable. In some implementations, the inventory locations 1114 may be configured to move independently of an outside operator. For example, the inventory locations 1114 may comprise a rack with a power source and a motor, operable by a computing device to allow the rack to move from one location within the facility 1102 to another.

One or more users 1116(1), 1116(2), . . . , 1116(U) and carts 1118(1), 1118(2), . . . , 118(T) or other material handling apparatus may move within the facility 1102. For example, the user 1116 may move about within the facility 1102 to pick or place the items 102 in various inventory locations 1114, placing them on the cart 1118 for ease of transport. The cart 1118 is configured to carry or otherwise transport one or more items 102. For example, the cart 1118 may include a basket, bag, bin, and so forth. In some implementations, the cart 1118 may include a detection system 122. For example, as items 102 are placed into or removed from the cart 1118, the detection system 122 may be used to read the tags 104 and generate tag data 134. The tag data 134 may then be used to determine the items 102 that are in the cart 1118.

Other material handling apparatuses such as robots, forklifts, cranes, aerial drones, and so forth, may move about the facility 1102 picking, placing, or otherwise moving the items 102. For example, a robot may pick an item 102 from a first inventory location 1114(1) and move the item 102 to a second inventory location 1114(2).

One or more sensors 1016 may be configured to acquire information in the facility 1102. The sensors 1016 may include the detection system 122 described above. Other sensors 1016, such as cameras, weight sensors, and so forth may also be used. The sensors 1016 may be stationary or mobile, relative to the facility 1102. For example, the inventory locations 1114 may contain weight sensors to acquire weight sensor data of items 102 stowed therein and detection systems 122 to acquire images of picking or placement of items 102 on shelves, and so forth. In another example, the facility 1102 may include cameras to obtain images of the user 1116 or other objects in the facility 1102. The sensors 1016 are discussed in more detail below with regard to FIG. 12.

While the storage area 1106 is depicted as having one or more aisles 1112, inventory locations 1114 storing the items 102, sensors 1016, and so forth, it is understood that the receiving area 1104, the transition area 1108, or other areas of the facility 1102 may be similarly equipped. Furthermore, the arrangement of the various areas within the facility 1102 is depicted functionally rather than schematically. For example, in some implementations, multiple different receiving areas 1104, storage areas 1106, and transition areas 1108 may be interspersed rather than segregated in the facility 1102.

The facility 1102 may include, or be coupled to, an inventory management system 138. The inventory management system 138 is configured to interact with users 1116 or devices such as sensors 1016, robots, material handling equipment, computing devices, and so forth, in one or more of the receiving area 1104, the storage area 1106, or the transition area 1108.

During operation of the facility 1102, the sensors 1016 may be configured to provide sensor data, or information based on the sensor data, to the inventory management system 138. The sensor data may include tag data 134, image data, non-image data such as weight sensor data obtained from weight sensors, and so forth.

The inventory management system 138 or other systems may use the sensor data to track the location of objects within the facility 1102, movement of the objects, or provide other functionality. Objects may include, but are not limited to, items 102, users 1116, carts 1118, and so forth. For example, a series of images acquired by a camera 1016(1) may indicate removal by the user 1116 of an item 102 from a particular location on the inventory location 1114 and placement of the item 102 on or at least partially within the cart 1118. The item 102 may be identified by using the detection system 122 to produce tag data 134 indicative of the tags 104 on the item 102. The resulting tag data 134 may be used to determine the type of item 102 that was picked or placed at the inventory location 1114.

The inventory management system 138 may include one or more software applications executing on a computer system to provide inventory management functions. These inventory management functions may include maintaining information indicative of the type, quantity, condition, cost, location, weight, or any other suitable parameters with respect to the items 102. The items 102 may be stocked, managed, or dispensed in terms of countable units, individual units, or multiple units, such as packages, cartons, crates, pallets, or other suitable aggregations. Alternatively, some items 102, such as bulk products, commodities, and so forth, may be stored in continuous or arbitrarily divisible amounts that may not be inherently organized into countable units. Such items 102 may be managed in terms of a measurable quantity such as units of length, area, volume, weight, time, duration, or other dimensional properties characterized by units of measurement. Generally speaking, a quantity of an item 102 may refer to either a countable number of individual or aggregate units of an item 102 or a measurable amount of an item 102, as appropriate.

When a customer order specifying one or more items 102 is received, or as a user 1116 progresses through the facility 1102, the corresponding items 102 may be selected or "picked" from the inventory locations 1114 containing those items 102. In various implementations, item picking may range from manual to completely automated picking. For example, in one implementation, a user 1116 may have a list of items 102 they desire and may progress through the facility 1102 picking items 102 from inventory locations 1114 within the storage area 1106 and placing those items 102 into a cart 1118. In other implementations, employees of the facility 1102 may pick items 102 using written or electronic pick lists derived from customer orders. These picked items 102 may be placed into the cart 1118 as the employee progresses through the facility 1102.

After items 102 have been picked, the items 102 may be processed at a transition area 1108. The transition area 1108 may be any designated area within the facility 1102 where items 102 are transitioned from one location to another or from one entity to another. For example, the transition area 1108 may be a packing station within the facility 1102. When the item 102 arrives at the transition area 1108, the items 102 may be transitioned from the storage area 1106 to the packing station. Information about the transition may be maintained by the inventory management system 138.

In another example, if the items 102 are departing the facility 1102, a list of the items 102 may be obtained and used by the inventory management system 138 to transition responsibility for, or custody of, the items 102 from the facility 1102 to another entity. For example, a carrier may accept the items 102 for transport with that carrier accepting responsibility for the items 102 indicated in the list. In another example, a user 1116 may purchase or rent the items 102 and remove the items 102 from the facility 1102. During use of the facility 1102, the user 1116 may move about the facility 1102 to perform various tasks, such as picking or placing the items 102 in the inventory locations 1114.

To facilitate operation of the facility 1102, the inventory management system 138 is configured to use the sensor data including the tag data 134, weight sensor data, image data and other information such as the item data, the physical layout data, and so forth, to generate interaction data 1120.

The interaction data 1120 may provide information about an interaction, such as a pick of an item 102 from the inventory location 1114, a place of an item 102 to the inventory location 1114, a touch made to an item 102 at the inventory location 1114, a gesture associated with an item 102 at the inventory location 1114, and so forth. The interaction data 1120 may include one or more of the type of interaction, interaction location identifier indicative of where from the inventory location 1114 the interaction took place, item identifier, quantity change to the item 102, user identifier, and so forth. The interaction data 1120 may then be used to further update the inventory data 1122. For example, the quantity of items 102 on hand at a particular lane on the shelf may be changed based on an interaction that picks or places one or more items 102.

The inventory management system 138 may combine or otherwise utilize data from different sensors 1016 of different types. For example, tag data 134 obtained by the detection system 122 may be used in conjunction with weight data obtained from weight sensors 1016 at the inventory location 1114 to determine the interaction data 1120.

The inventory management system 138 may generate other data. In one implementation, user billing data may be generated that comprises a bill or invoice for the items 102 that have been taken into the custody of the user 1116. For example, as the user 1116 leaves the facility 1102 with their cart 1118, a list and cost associated with the purchase for those items 102 may be determined, taxes or other fees assessed, and that information included in the user billing data.

The inventory management system 138 may also maintain inventory data 1122. For example, the inventory data 1122 may comprise information such as quantity on hand at a particular inventory location, determine when to order additional items 102 for restock, and so forth.

In some implementations, the inventory management system 138 may use the tag data 134 to direct the movement of items 102 within the facility 1102. For example, the user 1116 may be wearing an augmented reality headset that presents audible or visual information to the user 1116. The detection system 122 may read the tags 104 on the item 102 and generate tag data 134 that identifies that item 102. The inventory management system 138 may use that tag data 134 to determine that the item 102 is to be stowed in a particular inventory location 1114. The inventory management system 138 may generate instructions to present prompts to the user 1116 by way of the augmented reality headset, directing the user 1116 to place the item 102 in the particular inventory location 1114.

Figure 12:
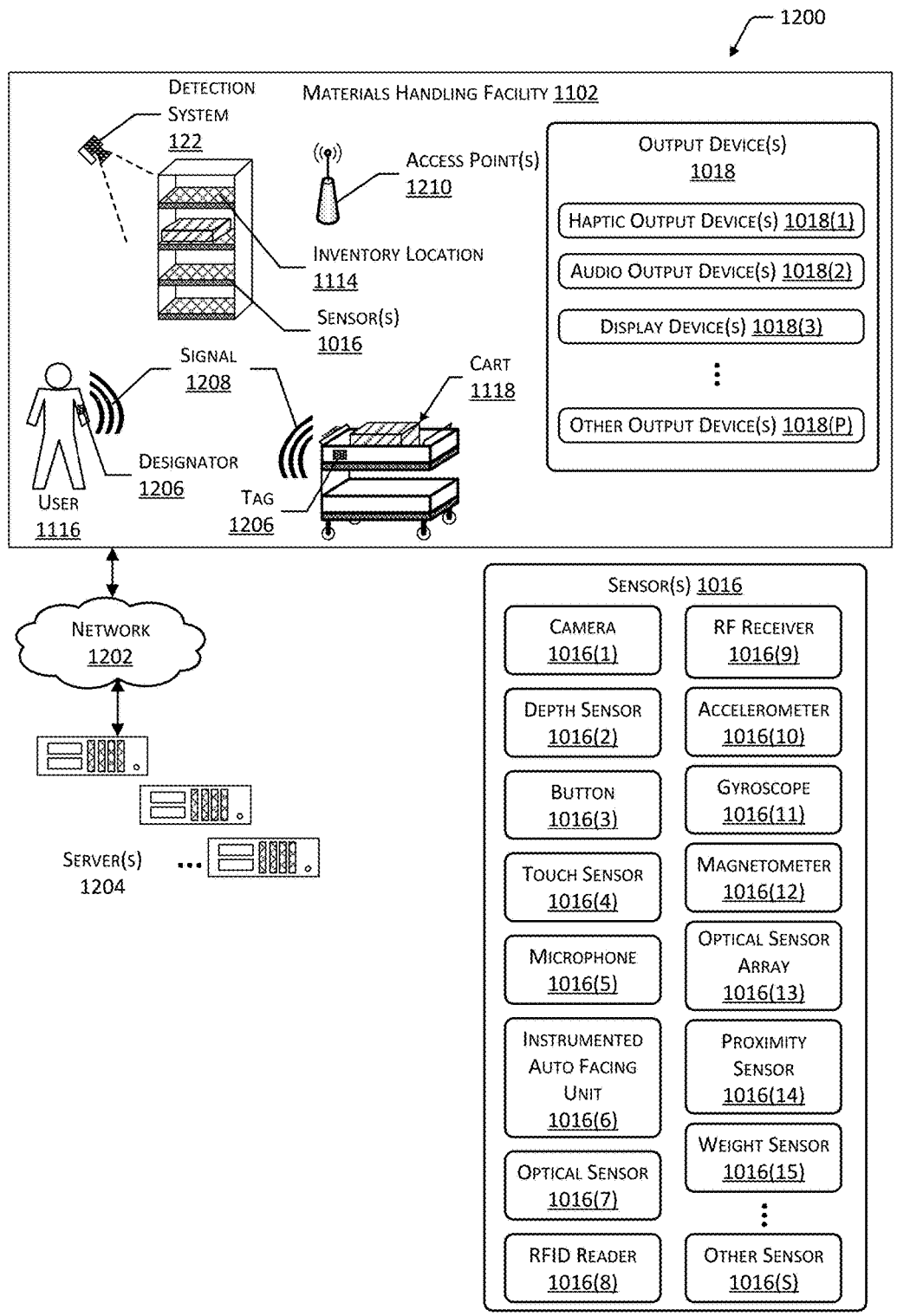
FIG. 12 is a block diagram illustrating additional details of the facility, according to some implementations.

FIG. 12 is a block diagram 1200 illustrating additional details of the facility 1102, according to some implementations. The facility 1102 may be connected to one or more networks 1202, which in turn connect to one or more servers 1204. The network 1202 may include private networks such as an institutional or personal intranet, public networks such as the Internet, or a combination thereof. The network 1202 may utilize wired technologies (e.g., wires, fiber optic cables, and so forth), wireless technologies (e.g., radio frequency, infrared, acoustic, optical, and so forth), or other connection technologies. The network 1202 is representative of any type of communication network, including one or more of data networks or voice networks. The network 1202 may be implemented using wired infrastructure (e.g., copper cable, fiber optic cable, and so forth), a wireless infrastructure (e.g., cellular, microwave, satellite, and so forth), or other connection technologies.

The servers 1204 may be configured to execute one or more modules or software applications associated with the inventory management system 138 or other systems. While the servers 1204 are illustrated as being in a location outside of the facility 1102, in other implementations, at least a portion of the servers 1204 may be located at the facility 1102. The servers 1204 may include memory, processors, and so forth such as described above with respect to the computing device 124.

The users 1116, the carts 1118, or other objects in the facility 1102 may be equipped with one or more designators 1206. The designators 1206 may be configured to emit a signal 1208. In one implementation, the designator 1206 may be a radio frequency identification (RFID) designator 1206 configured to emit a RF signal 1208 upon activation by an external signal. For example, the external signal may comprise a radio frequency signal or a magnetic field configured to energize or activate the RFID designator 1206. In another implementation, the designator 1206 may comprise a transmitter and a power source configured to power the transmitter. For example, the designator 1206 may comprise a Bluetooth Low Energy (BLE) transmitter and battery. In other implementations, the designator 1206 may use other techniques to indicate presence of the designator 1206. For example, an acoustic designator 1206 may be configured to generate an ultrasonic signal 1208, which is detected by corresponding acoustic receivers. In yet another implementation, the designator 1206 may be configured to emit an optical signal 1208.

The inventory management system 138 may be configured to use the designators 1206 for one or more of identification of the object, determining a location of the object, and so forth. For example, the users 1116 may wear designators 1206, the carts 1118 may have designators 1206 affixed, and so forth, which may be read and, based at least in part on signal strength, used to determine identity and location.

Generally, the inventory management system 138 or other systems associated with the facility 1102 may include any number and combination of input components, output components, and servers 1204.

The sensors 1016 may include the detection system 122 described above. During operation, the detection system 122 may produce tag data 134 that is used by the inventory management system 138. The one or more sensors 1016 may be arranged at one or more locations within the facility 1102. For example, the sensors 1016 may be mounted on or within a floor, wall, at a ceiling, at an inventory location 1114, on a cart 1118, may be carried or worn by a user 1116, and so forth.

The sensors 1016 may include one or more cameras 1016(1) or other imaging sensors. The one or more cameras 1016(1) may include imaging sensors configured to acquire images of a scene. The cameras 1016(1) are configured to detect light in one or more wavelengths including, but not limited to, terahertz, infrared, visible, ultraviolet, and so forth. The cameras 1016(1) may comprise charge coupled devices (CCD), complementary metal oxide semiconductor (CMOS) devices, microbolometers, and so forth. The inventory management system 138 may use image data acquired by the cameras 1016(1) during operation of the system 100 in the facility 1102. For example, the inventory management system 138 may identify items 102, users 1116, carts 1118, and so forth, based at least in part on their appearance within the image data acquired by the cameras 1016(1). The cameras 1016(1) may be mounted in various locations within the facility 1102. For example, cameras 1016(1) may be mounted overhead, on inventory locations 1114, may be worn or carried by users 1116, may be affixed to carts 1118, and so forth.

One or more depth sensors 1016(2) may also be included in the sensors 1016. The depth sensors 1016(2) are configured to acquire spatial or three-dimensional (3D) data, such as depth information, about objects within a field of view (FOV). The depth sensors 1016(2) may include range cameras, lidar systems, sonar systems, radar systems, structured light systems, stereo vision systems, optical interferometry systems, and so forth. The inventory management system 138 may use the 3D data acquired by the depth sensors 1016(2) to identify objects, determine a location of an object in 3D real space, and so forth.

One or more buttons 1016(3) may be configured to accept input from the user 1116. The buttons 1016(3) may comprise mechanical, capacitive, optical, or other mechanisms. For example, the buttons 1016(3) may comprise mechanical switches configured to accept an applied force from a touch of the user 1116 to generate an input signal. The inventory management system 138 may use data from the buttons 1016(3) to receive information from the user 1116. For example, the cart 1118 may be configured with a button 1016(3) to accept input from the user 1116 and send information indicative of the input to the inventory management system 138.

The sensors 1016 may include one or more touch sensors 1016(4). The touch sensors 1016(4) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The location within the material of that change in electrical resistance may indicate the position of the touch. The inventory management system 138 may use data from the touch sensors 1016(4) to receive information from the user 1116. For example, the touch sensor 1016(4) may be integrated with the cart 1118 to provide a touchscreen with which the user 1116 may select from a menu one or more particular items 102 for picking, enter a manual count of items 102 at an inventory location 1114, and so forth.

One or more microphones 1016(5) may be configured to acquire information indicative of sound present in the environment. In some implementations, arrays of microphones 1016(5) may be used. These arrays may implement beamforming techniques to provide for directionality of gain. The inventory management system 138 may use the one or more microphones 1016(5) to acquire information from acoustic designators 1206, accept voice input from the users 1116, determine ambient noise level, and so forth.

The sensors 1016 may include instrumented auto facing units (IAFUs) 1016(6). The AFU 1016(6) may comprise a position sensor configured to provide data indicative of displacement of a pusher. As an item 102 is removed from the AFU 1016(6), the pusher moves, such as under the influence of a spring, and pushes the remaining items 102 in the AFU 1016(6) to the front of the inventory location 1114. By using data from the position sensor and given item data such as a depth of an individual item 102, a count may be determined, based on a change in position data. For example, if each item 102 is 1 inch deep, and the position data indicates a change of 12 inches, the quantity held by the AFU 1016(6) may have changed by 12 items 102. This count information may be used to confirm or provide a cross check for a count obtained by other means, such as analysis of the weight sensor data.

The sensors 1016 may include one or more optical sensors 1016(7). The optical sensors 1016(7) may be configured to provide data indicative of one or more of color or intensity of light impinging thereupon. For example, the optical sensor 1016(7) may comprise a photodiode and associated circuitry configured to generate a signal or data indicative of an incident flux of photons. As described below, the optical sensor array 1016(13) may comprise a plurality of the optical sensors 1016(7). The optical sensors 1016(7) may include photodiodes, photoresistors, photovoltaic cells, quantum dot photoconductors, bolometers, pyroelectric infrared detectors, and so forth. For example, the optical sensor 1016(7) may use germanium photodiodes to detect infrared light.

One or more radio frequency identification (RFID) readers 1016(8), near field communication (NFC) systems, and so forth, may be included as sensors 1016. For example, the RFID readers 1016(8) may be configured to read the RF designators 1206. Information acquired by the RFID reader 1016(8) may be used by the inventory management system 138 to identify an object associated with the RF designator 1206 such as the item 102, the user 1116, the cart 1118, and so forth. For example, based on information from the RFID readers 1016(8) detecting the RF designator 1206 at different times and RFID readers 1016(8) having different locations in the facility 1102, a velocity of the RF designator 1206 may be determined.

One or more RF receivers 1016(9) may also be included as sensors 1016. In some implementations, the RF receivers 1016(9) may be part of transceiver assemblies. The RF receivers 1016(9) may be configured to acquire RF signals 1208 associated with Wi-Fi, Bluetooth, ZigBee, 2G, 3G, 4G, LTE, or other wireless data transmission technologies. The RF receivers 1016(9) may provide information associated with data transmitted via radio frequencies, signal strength of RF signals 1208, and so forth. For example, information from the RF receivers 1016(9) may be used by the inventory management system 138 to determine a location of an RF source, such as a communication interface onboard the cart 1118.

The sensors 1016 may include one or more accelerometers 1016(10), which may be worn or carried by the user 1116, mounted to the cart 1118, and so forth. The accelerometers 1016(10) may provide information such as the direction and magnitude of an imposed acceleration. Data such as rate of acceleration, determination of changes in direction, speed, and so forth, may be determined using the accelerometers 1016(10).

A gyroscope 1016(11) may provide information indicative of rotation of an object affixed thereto. For example, the cart 1118 or other objects may be equipped with a gyroscope 1016(11) to provide data indicative of a change in orientation of the object.

A magnetometer 1016(12) may be used to determine an orientation by measuring ambient magnetic fields, such as the terrestrial magnetic field. The magnetometer 1016(12) may be worn or carried by the user 1116, mounted to the cart 1118, and so forth. For example, the magnetometer 1016(12) mounted to the cart 1118 may act as a compass and provide information indicative of which direction the cart 1118 is oriented.

An optical sensor array 1016(13) may comprise one or optical sensors 1016(7). The optical sensors 1016(7) may be arranged in a regular, repeating, or periodic two-dimensional arrangement such as a grid. The optical sensor array 1016(13) may generate image data. For example, the optical sensor array 1016(13) may be arranged within or below an inventory location 1114 and obtain information about shadows of items 102, hand of the user 1116, and so forth.

The sensors 1016 may include proximity sensors 1016(14) used to determine presence of an object, such as the user 1116, the cart 1118, and so forth. The proximity sensors 1016(14) may use optical, electrical, ultrasonic, electromagnetic, or other techniques to determine a presence of an object. In some implementations, the proximity sensors 1016(14) may use an optical emitter and an optical detector to determine proximity. For example, an optical emitter may emit light, a portion of which may then be reflected by the object back to the optical detector to provide an indication that the object is proximate to the proximity sensor 1016(14). In other implementations, the proximity sensors 1016(14) may comprise a capacitive proximity sensor 1016(14) configured to provide an electrical field and determine a change in electrical capacitance due to presence or absence of an object within the electrical field.

The proximity sensors 1016(14) may be configured to provide sensor data indicative of one or more of a presence or absence of an object, a distance to the object, or characteristics of the object. An optical proximity sensor 1016(14) may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using a sensor 1016 such as a camera 1016(1). Based on an apparent distance between the features of the structured light pattern, the distance to the object may be calculated. Other techniques may also be used to determine distance to the object. In another example, the color of the reflected light may be used to characterize the object, such as skin, clothing, cart 1118, and so forth.

The one or more weight sensors 1016(15) are configured to measure the weight of a load, such as the item 102, the cart 1118, or other objects. The weight sensors 1016(15) may be configured to measure the weight of the load at one or more of the inventory locations 1114, the cart 1118, on the floor of the facility 1102, and so forth. For example, the shelf may include a plurality of lanes or platforms, with one or more weight sensors 1016(15) beneath each one to provide weight sensor data about an individual lane or platform. The weight sensors 1016(15) may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms of weight sensors 1016(15) may operate as transducers that generate one or more signals based on an applied force, such as that of the load due to gravity. For example, the weight sensor 1016(15) may comprise a load cell having a strain gauge and a structural member that deforms slightly when weight is applied. By measuring a change in the electrical characteristic of the strain gauge, such as capacitance or resistance, the weight may be determined. In another example, the weight sensor 1016(15) may comprise a force sensing resistor (FSR). The FSR may comprise a resilient material that changes one or more electrical characteristics when compressed. For example, the electrical resistance of a particular portion of the FSR may decrease as the particular portion is compressed. The inventory management system 138 may use the data acquired by the weight sensors 1016(15) to identify an object, determine a change in the quantity of objects, determine a location of an object, maintain shipping records, and so forth.

The sensors 1016 may include other sensors 1016(S) as well. For example, the other sensors 1016(5) may include smart floors, light curtains, ultrasonic rangefinders, thermometers, barometric sensors, hygrometers, and so forth. For example, smart floors may utilize one or more of transmitters or receivers of electromagnetic signals positioned in or beneath a floor to determine one or more of location or identification of an object within the facility.

In some implementations, the camera 1016(1) or other sensors 1016(5) may include hardware processors, memory, and other elements configured to perform various functions. For example, the cameras 1016(1) may be configured to generate image data, send the image data to another device such as the computing device 124, and so forth.

The facility 1102 may include one or more access points 1210 configured to establish one or more wireless networks. The access points 1210 may use Wi-Fi, NFC, Bluetooth, or other technologies to establish wireless communications between a device and the network 1202. The wireless networks allow the devices to communicate with one or more of the sensors 1016, the inventory management system 138, the designator 1206, a communication device of the cart 1118, or other devices.

Output devices 1018 may also be provided in the facility 1102. The output devices 1018 are configured to generate signals, which may be perceived by the user 1116 or detected by the sensors 1016.

Haptic output devices 1018(1) are configured to provide a signal that results in a tactile sensation to the user 1116. The haptic output devices 1018(1) may use one or more mechanisms such as electrical stimulation or mechanical displacement to provide the signal. For example, the haptic output devices 1018(1) may be configured to generate a modulated electrical signal, which produces an apparent tactile sensation in one or more fingers of the user 1116. In another example, the haptic output devices 1018(1) may comprise piezoelectric or rotary motor devices configured to provide a vibration, which may be felt by the user 1116.

One or more audio output devices 1018(2) may be configured to provide acoustic output. The acoustic output includes one or more of infrasonic sound, audible sound, or ultrasonic sound. The audio output devices 1018(2) may use one or more mechanisms to generate the acoustic output. These mechanisms may include, but are not limited to, the following: voice coils, piezoelectric elements, magnetorestrictive elements, electrostatic elements, and so forth. For example, a piezoelectric buzzer or a speaker may be used to provide acoustic output.

The display devices 1018(3) may be configured to provide output, which may be seen by the user 1116 or detected by a light-sensitive sensor such as a camera 1016(1) or an optical sensor 1016(7). In some implementations, the display devices 1018(3) may be configured to produce output in one or more of infrared, visible, or ultraviolet light. The output may be monochrome or in color. The display devices 1018(3) may be one or more of emissive, reflective, microelectromechanical, and so forth. An emissive display device 1018(3), such as using LEDs, is configured to emit light during operation. In comparison, a reflective display device 1018(3), such as using an electrophoretic element, relies on ambient light to present an image. Backlights or front lights may be used to illuminate non-emissive display devices 1018(3) to provide visibility of the output in conditions where the ambient light levels are low.

The display devices 1018(3) may be located at various points within the facility 1102. For example, the addressable displays may be located on inventory locations 1114, carts 1118, on the floor of the facility 1102, and so forth.

Other output devices 1018(P) may also be present. For example, the other output devices 1018(P) may include scent/odor dispensers, document printers, 3D printers or fabrication equipment, and so forth.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the system and techniques described above can be utilized in a variety of devices, environments, and situations. For example, the tags 104 may be placed on a user or other object and used to obtain motion capture data. In another example, the tags 104 may be placed on particular objects or targets and may be used to provide for annotation, registration, calibration, or other operations associated with computer vision, machine learning, and so forth. The systems and techniques allow for the tags 104 to be read while suppressing or omitting the background.

Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
   a camera having a filter that passes light with a wavelength of between 840 and 860 nanometers;
   a light source that emits light at a wavelength of between 800 nanometers and 830 nanometers; and
   a computing device comprising:
      a memory, storing first computer-executable instructions; and
      a hardware processor to execute the first computer-executable instructions to:
         acquire fluorescent image data from the camera;
         determine gradient magnitude values for pixels in the fluorescent image data;
         determine, for at least some of a plurality of windows that correspond to an area within the fluorescent image data, window score data that is based on a sum of the gradient magnitude values within a particular window and an area of the particular window;
         determine a candidate window based on the window score data, wherein the candidate window corresponds to a first rectangle indicative of a first area within the fluorescent image data;

determine, for the candidate window, a second rectangle that is centered on the first rectangle and wherein the second rectangle has a second area greater than the first area;
determine, based on a portion of the fluorescent image data within the second rectangle, binarized data in which each pixel in the binarized data is represented as either a 1 or a 0 value;
determine projected corner data indicative of four corners of the fluorescent image data of a tag as presented in the binarized data;
rectify the binarized data based on the projected corner data to produce rectified data;
designate cell boundaries in the rectified data, wherein the cell boundaries form a predetermined grid of cells, wherein each cell encompasses a plurality of pixels;
determine a cell score for at least one cell, wherein the cell score is based on intensity values of individual pixels of the fluorescent image data that are within the at least one cell;
determine, based on the cell score for the at least one cell in the predetermined grid of cells, probability distribution data indicative of a probability that a particular cell score is indicative of a binary 1 value or a binary 0 value;
determine, based on the probability distribution data and the cell score for the at least one cell, a confidence value for the at least one cell based on the probability that the at least one cell is representative of a binary 1 value or representative of a binary 0 value;
determine, based on the confidence value of the at least one cell, one or more possible tag variants;
determine at least one of the one or more possible tag variants is valid; and
generate tag data based on the at least one of the one or more possible tag variants, wherein the tag data is indicative of data encoded within the tag.

2. The system of claim 1, further comprising:
the memory, storing second computer-executable instructions; and
the hardware processor to execute the second computer-executable instructions to:
determine a first probability value representative of a probability that the particular cell score is representative of a binary 1;
determine a second probability value representative of a probability that the particular cell score is representative of a binary 0; and
wherein the confidence value for the at least one cell is based on the first probability value and the second probability value.

3. The system of claim 1, further comprising:
the memory, storing second computer-executable instructions; and
the hardware processor to execute the second computer-executable instructions to determine the at least one of the one or more possible tag variants comprising:
determine a least confident cell in the predetermined grid of cells that has a lowest confidence value;
determine a first possible tag variant in which the least confident cell is assigned a binary 1 value; and
determine a second possible tag variant in which the least confident cell is assigned a binary 0 value.

4. A method comprising:
acquiring image data with a camera that detects photons emitted by fluorescence of one or more marks in a tag;
determining a portion of the image data that depicts the tag;
determining rectified data based on the portion of the image data that depicts the tag, wherein the determining the rectified data comprises one or more of determining one or more corners of the tag, aligning the tag, or reducing perspective effects on the tag; and
determining, based on the rectified data, tag data encoded by the one or more marks in the tag.

5. The method of claim 4, the determining the portion of the image data that depicts the tag further comprising:
determining gradient magnitude values based on intensity values of pixels within the image data;
determining, for at least some of a plurality of windows that correspond to an area within the image data, window score data that comprises a sum of the gradient magnitude values within a particular window and an area of the particular window;
determining a candidate window based on the window score data, wherein the candidate window corresponds to a first rectangle indicative of a first area within the image data;
determining, for the candidate window, a second rectangle that is centered on the first rectangle and has a second area greater than the first area; and
designating as the portion of the image data that depicts the tag a portion of the image data within the second rectangle.

6. The method of claim 5, the determining the window score data further comprising:
determining an area value indicative of the area bounded by the particular window;
subtracting a product of the area value and a predefined value from the sum of gradient magnitude values; and
wherein the first area is greater than or equal to a minimum window size value.

7. The method of claim 4, the determining the portion of the image data that depicts the tag comprising:
determining gradient magnitude values based on intensity values of pixels within the image data;
determining, for a window that corresponds to an area within the image data, a gradient orientation of at least a portion of the pixels within the window based on the gradient magnitude values;
determining a histogram of the gradient orientations of the at least a portion of the pixels within the window;
determining a first peak value in the histogram at a first orientation;
determining a second peak value in the histogram at a second orientation;
determining that the first orientation and the second orientation differ by at least a threshold value; and
designating the window as the portion of the image data that depicts the tag.

8. The method of claim 4, the determining the rectified data further comprising:
determining, based on the portion of the image data that depicts the tag, binarized data in which each pixel in the binarized data is represented as either a first value or a second value;
determining projected corner data indicative of four corners of an image of the tag as presented in the binarized data, the determining the projected corner data comprising:

designating a first diagonal line extending from a first initial corner to a second initial corner of the portion of the image data that depicts the tag, wherein the first initial corner is opposite the second initial corner;

determining a first projected corner at a first point on the first diagonal line at which a first pixel having the second value is projected onto the first diagonal line;

determining a second projected corner at a second point on the first diagonal line at which a last pixel having the second value is projected onto the first diagonal line;

designating a second diagonal line that is at a midpoint of, and perpendicular to, a line extending from the first projected corner to the second projected corner;

determining a third projected corner at a first point on the second diagonal line at which a first pixel having the second value is projected onto the second diagonal line;

determining a fourth projected corner at a second point on the second diagonal line at which a last pixel having the second value is projected onto the second diagonal line; and determining the rectified data by applying a transformation to the portion of the image data that depicts the tag as presented in the binarized data based on the projected corner data such that the first, second, third, and fourth projected corners form a rectangle.

9. The method of claim 4, further comprising:
designating cell boundaries in the rectified data, wherein the cell boundaries form a grid of cells, wherein each cell encompasses a plurality of pixels;

determining a cell score for at least one cell, wherein the cell score is based on intensity values of individual pixels within the at least one cell;

determining, based on the cell score for the at least one cell, probability distribution data indicative of a probability that a particular cell score is indicative of the at least one cell representing a first cell value or a second cell value;

determining, using the cell score for the at least one cell as an input to the probability distribution data, a confidence value for the at least one cell;

determining, based at least in part on the confidence value for the at least one cell, a cell value indicative that the at least one cell is representative of either the first cell value or the second cell value; and wherein the determining the tag data is based on the cell value determined for the at least one cell.

10. The method of claim 9, the designating the cell boundaries in the rectified data further comprising:
retrieving information indicative of a count of x rows and a count of y columns associated with the one or more marks in the tag; and dividing, based on the information, the rectified data into x rows and y columns.

11. The method of claim 9, the determining the confidence value for the at least one cell comprising:
determining a first probability value representative of a probability that the particular cell score is representative of the first cell value;

determining a second probability value representative of a probability that the particular cell score is representative of the second cell value; and wherein the confidence value for the at least one particular cell is based on the first probability value and the second probability value.

12. The method of claim 9, further comprising:
determining a set of one or more cells for which a respective confidence value is below a threshold value;

determining a possible tag variant by inverting a cell value of one or more of the one or more cells in the set;

determining, based on the cell value of the one or more cells in the possible tag variant, that the possible tag variant is valid; and wherein the determining the tag data uses the possible tag variant.

13. A system comprising:
a camera to capture an image of light emitted by one or more marks made of fluorescent ink, wherein the one or more marks comprise a tag;

a computing device comprising:
a memory, storing first computer-executable instructions; and a hardware processor to execute the first computer-executable instructions to:
acquire first image data with the camera;
determine a portion of the first image data that depicts the tag;
determine, based on the portion of the first image data that depicts the tag, rectified data, wherein the rectified data represents a depiction of the tag after one or more of alignment of the tag or reduction of perspective effects on the tag; and
determine, based on the rectified data, tag data encoded by the tag.

14. The system of claim 13, wherein the fluorescent ink is stimulated by light at a wavelength of between 800 nanometers and 830 nanometers and emits photons at a wavelength of between 840 and 860 nanometers, and further comprising a filter in an optical path of the camera that passes the photons emitted by the fluorescent ink and one or more of attenuates or blocks photons at other wavelengths.

15. The system of claim 13, further comprising:
the memory, storing second computer-executable instructions; and the hardware processor to execute the second computer-executable instructions to:
determine gradient magnitude values based on intensity values of pixels within the first image data;
determine, for one or more of a plurality of windows, window score data based on:
the gradient magnitude values of the pixels within a particular window, and
an area of the particular window,
wherein the particular window corresponds to a first rectangle indicative of a first area within the first image data;
determine, based on the window score data, a candidate window specifying the first rectangle within the first image data;
determine, for the candidate window, a second rectangle that is centered on the first rectangle and has a second area greater than the first area; and
designate the portion of the first image data within the second rectangle as the portion of the first image data that depicts the tag.

16. The system of claim 15, further comprising:
the memory, storing third computer-executable instructions to determine the window score data; and the hardware processor to execute the third computer-executable instructions to:
determine an area value indicative of the area bounded by the particular window; and subtract a product of the area value and a predefined value from a sum of gradient magnitude values.

17. The system of claim 13, further comprising:
the memory, storing second computer-executable instructions to determine the portion of the first image data that depicts the tag; and
the hardware processor to execute the second computer-executable instructions to:
  determine a histogram of gradient orientations for a first portion of the first image data;
  determine a first peak value in the histogram at a first orientation;
  determine a second peak value in the histogram at a second orientation;
  determine that the first orientation and the second orientation differ by at least a threshold value; and
  designate the first portion of the first image data as the portion of the first image data that depicts the tag.

18. The system of claim 13, further comprising:
the memory, storing second computer-executable instructions to determine the rectified data; and
the hardware processor to execute the second computer-executable instructions to:
  determine, based on the portion of the first image data that depicts the tag, binarized data in which each pixel in the binarized data is represented as either a first value or a second value;
  designate a first diagonal line extending from a first initial corner to a second initial corner of the portion of the first image data that depicts the tag, wherein the first initial corner is opposite the second initial corner;
  determine a first projected corner at a first point on the first diagonal line at which a first pixel having the first value is projected onto the first diagonal line;
  determine a second projected corner at a second point on the first diagonal line at which a last pixel having a value of the first value is projected onto the first diagonal line;
  designate a second diagonal line that is at a midpoint of, and perpendicular to, a line extending from the first projected corner to the second projected corner;
  determine a third projected corner at a first point on the second diagonal line at which a first pixel having the first value is projected onto the second diagonal line;
  determine a fourth projected corner at a second point on the second diagonal line at which a last pixel having the second value is projected onto the second diagonal line; and
  determine the rectified data by transforming an image of the tag as presented in the binarized data based on the first, second, third, and fourth projected corners such that the first, second, third, and fourth projected corners form a rectangle.

19. The system of claim 13, further comprising:
the memory, storing second computer-executable instructions; and
the hardware processor to execute the second computer-executable instructions to:
  designate cell boundaries in the rectified data, wherein the cell boundaries form a predetermined grid of cells;
  determine a cell score for at least one cell, wherein the cell score is based on intensity values of individual pixels within the at least one cell;
  determine, based on the cell score for the at least one cell, probability distribution data indicative of a probability that a particular cell score is indicative of the cell representing a first cell value or a second cell value;
  determine, using the cell score for the at least one cell as an input to the probability distribution data, a confidence value for the at least one cell;
  determine, based at least in part on the confidence values for the at least one cell, a cell value indicative that the cell is representative of either a first cell value or a second cell value; and
  wherein the determining the tag data is based on the cell value determined for the at least one cell.

20. The system of claim 19, further comprising:
the memory, storing third computer-executable instructions; and
the hardware processor to execute the third computer-executable instructions to:
determine a set of one or more cells for which a respective confidence value is below a threshold value;
determine a possible tag variant by inverting the respective confidence values of at least one of the one or more cells in the set;
determine, based on the respective confidence values of the cells in the possible tag variant, that the possible tag variant is valid; and
wherein the determining the tag data uses the possible tag variant.

* * * * *

UNITED STATES PATENT AND TRADEMARK OFFICE
CERTIFICATE OF CORRECTION

Page 1 of 1

PATENT NO. : 10,346,659 B1
APPLICATION NO. : 15/927561
DATED : July 9, 2019
INVENTOR(S) : Ejaz Ahmed et al.

It is certified that error appears in the above-identified patent and that said Letters Patent is hereby corrected as shown below:

Claim 11, Column 33, Lines 65-66:
Reads "wherein the confident value for the at least one particular cell"
When it should read --wherein the confident value for the at least one cell--

Signed and Sealed this
First Day of October, 2019

Andrei Iancu
*Director of the United States Patent and Trademark Office*